US012572751B2

(12) United States Patent
Han et al.

(10) Patent No.: US 12,572,751 B2
(45) Date of Patent: Mar. 10, 2026

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventors: Hyojung Han, Suwon-si (KR); Yoonjin Yoon, Suwon-si (KR); Yoonjung Choi, Suwon-si (KR); Sangha Kim, Suwon-si (KR); Seokchan Ahn, Suwon-si (KR); Taehwan Yoo, Suwon-si (KR); Beomseok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 283 days.

(21) Appl. No.: 18/219,339

(22) Filed: Jul. 7, 2023

(65) Prior Publication Data
US 2023/0359836 A1 Nov. 9, 2023

Related U.S. Application Data

(63) Continuation of application No. PCT/KR2022/017469, filed on Nov. 8, 2022.

(30) Foreign Application Priority Data

Nov. 9, 2021 (KR) ......................... 10-2021-0153297

(51) Int. Cl.
*G06F 40/40* (2020.01)

(52) U.S. Cl.
CPC .................................... *G06F 40/40* (2020.01)

(58) Field of Classification Search
None
See application file for complete search history.

(56) References Cited

U.S. PATENT DOCUMENTS 9,128,926 B2 9/2015 Waibel
10,599,784 B2 3/2020 Yoo
(Continued)

FOREIGN PATENT DOCUMENTS

CN 110211570 A 9/2019
JP 2000-207400 A 7/2000
(Continued)

OTHER PUBLICATIONS

Renjie Zheng et al., "Fluent and Low-latency Simultaneous Speech-to-Speech Translation with Self-adaptive Training", Findings of the Association for Computational Linguistics: EMNLP 2020, Nov. 16-20, 2020, pp. 3928-3937.
(Continued)

*Primary Examiner* — Nicole A K Schmieder
(74) *Attorney, Agent, or Firm* — Sughrue Mion, PLLC

(57) ABSTRACT

An electronic device which obtains a first translated text in which a first phrase in an original text sequence of a first language is translated in a second language by inputting the first phrase to a translation model, determines an extent of delay in translation of the first phrase by comparing a time-point of the first phrase with a time-point of the first translated text, identifies one phrase from among the first phrase and a second phrase following the first phrase based on the extent of delay, obtains a summary text of the identified phrase by inputting the identified phrase to a summary model, obtains a second translated text in which identified phrase or the summary text is translated in the second language by inputting the identified phrase or the summary text to the translation model, and outputs the second translated text after the first translated text is output.

14 Claims, 17 Drawing Sheets

(56) References Cited

U.S. PATENT DOCUMENTS

| | | | |
|---|---|---|---|
| 11,120,063 B2 | 9/2021 | Kawano et al. | |
| 11,551,675 B2 | 1/2023 | Indurthi et al. | |
| 2008/0077390 A1 | 3/2008 | Nagao | |
| 2013/0013287 A1* | 1/2013 | Takayama | G06F 8/34 |
| | | | 704/4 |
| 2016/0314116 A1 | 10/2016 | Kamatani et al. | |
| 2018/0165276 A1 | 6/2018 | Yoo | |
| 2019/0019511 A1 | 1/2019 | Kawano et al. | |
| 2019/0115010 A1* | 4/2019 | Yu | G06F 40/58 |
| 2020/0311804 A1 | 10/2020 | Buckholdt et al. | |
| 2021/0065690 A1 | 3/2021 | Indurthi et al. | |
| 2021/0082407 A1 | 3/2021 | Kim et al. | |

FOREIGN PATENT DOCUMENTS

| | | | |
|---|---|---|---|
| JP | 3352799 B2 | 12/2002 | |
| JP | 6841239 B2 | 3/2021 | |
| KR | 10-2016-0106362 A | 9/2016 | |
| KR | 10-2018-0066513 A | 6/2018 | |
| KR | 10-2019-0057509 A | 5/2019 | |
| KR | 10-2019-0061578 A | 6/2019 | |
| KR | 10-2021-0028041 A | 3/2021 | |
| KR | 10-2021-0032809 A | 3/2021 | |
| KR | 10-2021-0060018 A | 5/2021 | |

OTHER PUBLICATIONS

International Search Report (PCT/ISA/210) issued by the International Searching Authority on Feb. 16, 2023 for International Patent Application No. PCT/KR2022/017469.
Written Opinion (PCT/ISA/237) issued by the International Searching Authority on Feb. 16, 2023 for International Patent Application No. PCT/KR2022/017469.
Communication dated Sep. 19, 2024, issued by the European Patent Office for European Patent Application No. 22893156.4.

* cited by examiner

FIG. 4

| t = 19 | | | | | | | | | | | | | | | | | | | | | | | |
| --- | --- | --- | --- | --- | --- | --- | --- | --- | --- | --- | --- | --- | --- | --- | --- | --- | --- | --- | --- | --- | --- | --- |
| TIME-POINT | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| SUMMARY TEXT SEQUENCE | | | | EoP | | | | | | | EoP | | | | EoP | | | EoP | | | | |
| ORIGINAL TEXT SEQUENCE | X | X | X | X EoP | X | X | X | X | X | X_j EoP | X_j X_j' | X_j' | X_j' EoP | | | X | X | X | X | | | |
| TRANSLATED TEXT SEQUENCE | a | b | c | d | e | f | g | h | i EoP | j | k | l | m | n | o | p | q | r EoP | s | | | |

ELECTRONIC DEVICE AND CONTROLLING METHOD OF ELECTRONIC DEVICE

CROSS-REFERENCE TO RELATED APPLICATIONS

This application is a continuation of PCT International Application No. PCT/KR2022/017469, which was filed on Nov. 8, 2022, and claims priority to Korean Patent Application No. 10-2021-0153297 filed on Nov. 9, 2021 in the Korean Intellectual Property Office, the disclosures of which are incorporated herein by reference in their entireties.

BACKGROUND

1. Field

The present disclosure relates to an electronic device and a method of controlling the electronic device, and more particularly to an electronic device capable of obtaining a translated text sequence for an original text sequence and a controlling method thereof.

2. Description of Related Art

Developments in technology capable of translating and providing in real-time an original text using artificial intelligence are in progress, and in particular, research on simultaneous interpretation technology which recognizes a user voice by an utterance of the user and then outputs a translation of the user voice into another language is underway.

In terms of simultaneous interpretation or translation, although a physical difference is present to some extent between an input time-point of an original text and an output time-point of a translated text, a problem may occur when a difference between the input time-point of the original text and the output time-point of the translated text is excessively great or excessively small.

Specifically, when the difference between the input time-point of the original text and the output time-point of the translated text is excessively great, it may hinder smooth communication because there is a difference between the input time-point of the original text and the output time-point of the translated text with respect to the same content, and there is concern that an extent of delay may intensify even more as time passes. Meanwhile, when the difference between the input time-point of the original text and the output time-point of the translated text is excessively small, there is a problem of an awkward pause being accompanied until a next original text is sufficiently input to an extent translation is performed after an output of the translated text is completed with respect to the input original text.

Although research into solving the problems according to the difference between the input time-point of the original text and the output time-point of the translated text in the interpretation and translation process is underway, the problem of delay when the difference between the input time-point of the original text and the output time-point of the translated text is excessively great and the problem of an awkward pause when the input time-point of the original text and the output time-point of the translated text is excessively small have not been effectively resolved.

SUMMARY

According to an aspect of the present disclosure, an electronic device includes a memory configured to store instructions; and a processor configured to execute the instructions to: obtain, based on an original text sequence in a first language comprising a plurality of phrases, a first translated text in which a first phrase of the original text sequence is translated in a second language by inputting the first phrase to a translation model; determine an extent of delay in translation of the first phrase by comparing a time-point of the first phrase with a time-point of the first translated text; identify, based on the extent of delay, one phrase from among the first phrase and a second phrase of the original text sequence following the first phrase; obtain a summary text of the identified phrase by inputting the identified phrase to a summary model; obtain, based on the extent of delay, a second translated text in which the identified phrase or the summary text is translated in the second language by inputting the identified phrase or the summary text to the translation model; and output the second translated text after the first translated text is output.

The processor is further configured to execute the instructions to: obtain, based on the extent of delay being less than the first threshold value, the summary text of the first phrase by inputting the first phrase to the summary model; and obtain the second translated text by inputting the summary text to the translation model.

The processor is further configured to execute the instructions to: obtain a third translated text in which the second phrase is translated in the second language by inputting the second phrase to the translation model; and output the third translated text after the second translated text is output.

The processor is further configured to execute the instructions to: obtain, based on the extent of delay being greater than or equal to the second threshold value, the summary text of the second phrase by inputting the second phrase to the summary model; and obtain the second translated text by inputting the summary text to the translation model.

The processor is further configured to execute the instructions to: obtain, based on the extent of delay being greater than or equal to the first threshold value and less than the second threshold value, the second translated text by inputting the second phrase to the translation model.

The extent of delay is determined based on at least one of: a difference between a time-point at which a first word in the first phrase is input to the translation model and a time-point at which a first word is output through the translation model, a difference between a time-point at which a last word in the first phrase is input to the translation model and a current time-point, and a difference between a length of the first translated text output until the current time-point and a whole length of the first translated text which is predicted according to a length of the first phrase.

The processor is further configured to execute the instructions to: identify the plurality of phrases in the original text sequence based on whether each of a plurality of words in the original text sequence corresponds to an end of phrase; and store information on each of the plurality of phrases in the memory.

The summary model is configured to: identify, based on a plurality of words in the identified phrase being input to the summary model, a compression rate of each of the words based on an importance of the word; and output the summary text of the identified phrase based on the identified compression rate.

The summary model is further configured to obtain the summary text based on a length of a pre-set summary text.

The summary model is further configured to obtain the summary text based on the identified phrase and at least one phrase obtained prior to the identified phrase.

According to an aspect of the present disclosure, a method of controlling the electronic device includes: obtaining, based on an original text sequence in a first language comprising a plurality of phrases, a first translated text in which a first phrase of the original text sequence is translated in a second language by inputting the first phrase to a translation model; determining an extent of delay in translation of the first phrase by comparing a time-point of the first phrase with a time-point of the first translated text; identifying, based on the extent of delay, one phrase from among the first phrase and a second phrase of the original text sequence following the first phrase; obtaining a summary text of the identified phrase by inputting the identified phrase to a summary model; obtaining, based on the extent of delay, a second translated text in which the identified phrase or the summary text is translated in the second language by inputting the identified phrase or the summary text to the translation model; and outputting the second translated text after the first translated text is output.

The identifying the one phrase includes obtaining, based on the extent of delay being less than a pre-set first threshold value, a first summary text of the first phrase by inputting the first phrase to the summary model.

The obtaining the second translated text includes obtaining the second translated text by inputting the first summary text to the translation model.

The method further includes: obtaining a third translated text in which the second phrase is translated in the second language by inputting the second phrase to the translation model; and outputting the third translated text after the second translated text is output.

The identifying the one phrase further includes obtaining, based on the extent of delay being greater than or equal to a pre-set second threshold value, a second summary text of the second phrase by inputting the second phrase from among the plurality of phrases to the summary model, and the obtaining the second translated text further includes obtaining the second translated text by inputting the second summary text to the translation model.

The method further includes: obtaining, based on the extent of delay being greater than or equal to a first threshold value and less than a second threshold value, the second translated text by inputting the second phrase to the translation model.

According to an aspect of present disclosure, a non-transitory computer readable medium for storing computer readable program code or instructions for carrying out operations, when executed by a processor, for controlling an electronic device, the operations including: obtaining, based on an original text sequence in a first language comprising a plurality of phrases, a first translated text in which a first phrase of the original text sequence is translated in a second language by inputting the first phrase to a translation model; determining an extent of delay in translation of the first phrase by comparing a time-point of the first phrase with a time-point of the first translated text; identifying, based on the extent of delay, one phrase from among the first phrase and a second phrase of the original text sequence following the first phrase; obtaining a summary text of the identified phrase by inputting the identified phrase to a summary model; obtaining, based on the extent of delay, a second translated text in which the identified phrase or the summary text is translated in the second language by inputting the identified phrase or the summary text to the translation model; and outputting the second translated text after the first translated text is output.

The identifying the one phrase includes obtaining, based on the extent of delay being less than a pre-set first threshold value, a first summary text of the first phrase by inputting the first phrase to the summary model, and the obtaining the second translated text includes obtaining the second translated text by inputting the first summary text to the translation model.

The operations further include: obtaining a third translated text in which the second phrase is translated in the second language by inputting the second phrase to the translation model; and outputting the third translated text after the second translated text is output.

The identifying the one phrase further includes obtaining, based on the extent of delay being greater than or equal to a pre-set second threshold value, a second summary text of the second phrase by inputting the second phrase from among the plurality of phrases to the summary model, and the obtaining the second translated text further includes obtaining the second translated text by inputting the second summary text to the translation model.

The operations further include: obtaining, based on the extent of delay being greater than or equal to a first threshold value and less than a second threshold value, the second translated text by inputting the second phrase to the translation model.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 4 is a block diagram illustrating in detail a configuration of an electronic device according to an embodiment;

DETAILED DESCRIPTION

Figure 1:
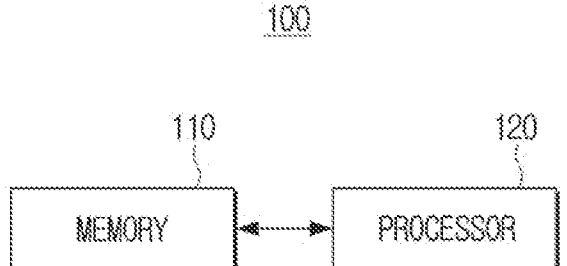
FIG. 1 is a block diagram illustrating schematically a configuration of an electronic device according to an embodiment.

The embodiments herein and the various features and advantageous details thereof are explained more fully with reference to the non-limiting embodiments that are illustrated in the accompanying drawings and detailed in the following description, where similar reference characters denote corresponding features consistently throughout. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

Terms used in the present disclosure are used merely to describe a specific embodiment, and it is to be understood that the terms are not intended to limit the scope of the present disclosure.

In the present disclosure, a singular expression includes a plural expression, unless otherwise specified.

In the present disclosure, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

In the present disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

Expressions such as "first," "second," "1st," "2nd" and so on used herein may be used to refer to various elements regardless of order and/or importance, and it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

On the other hand, when a certain element (e.g., first element) is indicated as "directly coupled with/to" or "directly connected to" another element (e.g., second element), it may be understood as the other element (e.g., third element) not being present between the certain element and the another element.

The expression "configured to . . . (or set up to)" used in the present disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware.

Rather, in a certain circumstance, the expression "a device configured to . . . " may mean something that the device "may perform . . . " together with another device or components. For example, the phrase "a processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in the memory device.

The terms "module" or "part" used in the embodiments herein perform at least one function or operation, and may be implemented with a hardware or software, or a combination of hardware and software. In addition, a plurality of "modules" or a plurality of "parts", except for a "module" or a "part" which needs to be implemented to a specific hardware, may be integrated to at least one module and implemented in at least one processor.

Various elements and areas in the drawings have been schematically shown. Accordingly, the present disclosure is not limited by a relative size or distance shown in the accompanied drawings.

Embodiments according to the present disclosure will be described in detail below so as to enable those of ordinary skill in the art to which the present disclosure pertains to easily conceive the present disclosure taking in to reference the accompanied drawings.

FIG. 1 is a block diagram illustrating schematically a configuration of an electronic device 100 according to an embodiment.

The 'electronic device 100' the present disclosure may refer to a device which may obtain a translated text sequence of an original text sequence. Specifically, the electronic device 100 may obtain the translated text sequence by inputting the original text sequence to a translation model, and output the obtained translated text sequence. In addition, the electronic device 100 may obtain a translated summary text by inputting a summary text to the translation model after obtaining the summary text by inputting the original text sequence in a summary model.

As shown in FIG. 1, the electronic device 100 may include a memory 110 and a processor 120.

The memory 110 may be stored with at least one instruction associated with the electronic device 100. Further, the memory 110 may be stored with an operating system (O/S) for operating the electronic device 100. In addition, the memory 110 may be stored with various software programs or applications for operating the electronic device 100 according to the various embodiments of the present disclosure. Further, the memory 110 may include a semiconductor memory such as a flash memory, a magnetic storage medium such as a hard disk, or the like.

Specifically, the memory 110 may be stored with various software modules for operating the electronic device 100 according to the various embodiments of the present disclosure, and the processor 120 may control an operation of the electronic device 100 by executing various software modules stored in the memory 110. That is, the memory 110 may be accessed by the processor 120 and reading/writing/modifying/deleting/updating of data may be performed by the processor 120.

In the present disclosure, the term memory 110 may be used as a meaning which includes the memory 110, a read only memory (ROM; not shown) within the processor 120, a random access memory (RAM; not shown) or a memory card (not shown) mounted to the electronic device 100 (e.g., a micro SD card, a memory stick).

According to the various embodiments of the present disclosure, the memory 110 may be stored with information on the original text sequence, information on the translated text sequence, information on the summary text sequence, and the like. Further, the memory 110 may be stored with information on the translation model, information on the summary model, and the like. In addition, the memory 110 may be stored with information on a plurality of phrases, information on various threshold values according to the present disclosure, information on an extent of delay (or lag) in translation, and the like.

The processor 120 may control the overall operation of the electronic device 100. Specifically, the processor 120 may be coupled with a configuration of the electronic device 100 which includes the memory 110, and may control the overall operation of the electronic device 100 by executing at least one instruction stored in the memory 110 as described above.

The processor 120 may be implemented as at least one from among an application specific integrated circuit (ASIC), an embedded processor, a microprocessor, a hardware control logic, a hardware finite state machine (FSM), and a digital signal processor (DSP). In the present disclosure, the term processor 120 may be used as a meaning which includes a central processing unit (CPU), a graphic processing unit (GPU), a main processing unit (MPU), and the like.

Specifically, according to the various embodiments of the present disclosure, the processor 120 may obtain the translated text sequence by inputting the original text sequence to the translation model, and output the obtained translated text sequence. In addition, the processor 120 may obtain a translated summary text by inputting a summary text to the translation model after obtaining the summary text by inputting the original text sequence to the summary model.

The 'translation model' may refer to a neural network model trained to obtain the translated text sequence corresponding to the input original text sequence, and may also be referred to as an 'interpretation model,' an 'interpretation and translation model,' or the like for being able to provide, in real-time, the translated text sequence in a form of a voice or text through the translation model.

The 'summary model' may refer to a neural network model trained to obtain the summary text corresponding to the input phrase. Specifically, the summary model may be implemented in a form of a sequence to sequence model which includes an encoder and a decoder.

The translation model may be trained to obtain a translated text sequence of a second language by translating an original text sequence of a first language. The summary model may be trained to obtain a summary text sequence of the first language by summarizing the original text sequence of the first language. It is to be noted that there are no particular limitation to the type of the first language and the type of the second language. A neural network included in the translation model and the summary model may be, for example, a Transformer, a Recurrent Neural Network (RNN) or a Long Short-Term Memory (LSTM), but is not limited thereto.

A method of controlling the processor 120 to obtain the translated text sequence of the original text sequence according to the various embodiments of the present disclosure will be described below.

The processor 120 may obtain the original text sequence of the first language. In the present disclosure, the term 'text sequence' may be used as the term for designating a set of characters, words, or phrases which is input sequentially.

When the original text sequence of the first language is obtained, the processor 120 may obtain a first translated text in which a first phrase from among a plurality of phrases included in the original text sequence is input to the translation model and the first phrase is translated into the second language.

Specifically, the processor 120 may obtain the first translated text in which the first phrase is translated into the second language by sequentially inputting the original text sequence to the translation model as the original text sequence is obtained. Here, a unit of the text which is input to the translation model may be referred to as a token, and for example, the token may mean a word unit.

In the present disclosure, the term 'phrase (or syntax)' may refer to a set of a plurality of words. A criterion for distinguishing an end of a phrase may be determined according to a meaning of each word, a punctuation mark, or the like, but it should be noted that there is no particular limitation accompanying the distinguishing criterion of the phrase according to the present disclosure.

Specifically, the processor 120 may identify, based on a plurality of words included in the original text sequence, a plurality of phrases based on whether each of the plurality of words are the end of the phrase, and store information on each of the plurality of phrases in the memory 110. The identifying the plurality of phrases included in the original text sequence is for inputting each of the plurality of phrases to the summary model which will be described below.

The processor 120 may determine an extent of delay in translation for translating the first phrase by comparing an obtained time-point of the first phrase with an obtained time-point of the first translated text. Here, the term 'extent of delay in translation' may be used as a term for representing a scale which represents how much translation of a specific phrase is being delayed. Specifically, the extent of delay in translation may represent not only when a rate of translation is excessively slow compared to an input rate of the original text, but also when the rate of translation is excessively fast compared to the input rate of the original text.

The following is a description of comparing the obtained time-point of the first phrase with the obtained time-point of the first translated text will be described as a main embodiment, but various criteria such as comparing a time-point at which the first phrase is input to the translation model with a time-point at which the first translated text is output by the translation model may be followed.

In an embodiment of the present disclosure, the extent of delay in translation may be determined based on at least one of: a difference between a time-point at which a first word included in the first phrase is input to the translation model and a time-point at which a first word is output through the translation model, a difference between a time-point at which a last word included in the first phrase is input to the translation model and a current time-point, and a difference between a length of the first translated text output until the current time-point and a whole length of the first translated text which is predicted according to a length of the first phrase. The first word output through the translation model may be a translation of the first word input to the translation model, or may be a first translated word of the first phrase input to the translation model.

A detailed method for determining the extent of delay in translation according to the present disclosure will be described in greater detail with reference to FIG. 5.

According to an embodiment of the present disclosure, the processor 120 may identify one phrase from among the first phrase and a second phrase following the first phrase, based on the determined extent of delay in translation of the first phrase. Specifically, the processor 120 may identify whether translation of the first phrase is in an excessively delayed state or in an excessively fast state based on the extent of delay in the translated text of the first phrase, and identify one phrase from among the first phrase and the second phrase according to the identified result.

The processor 120 may obtain a summary text of the identified phrase by inputting the identified phrase to the summary model. In other words, when a phrase from among the first phrase and the second phrase is identified based on the translated text of the first phrase, the identified phrase may be a subject of summarization as it is input to the summary model.

The processor 120 may obtain a second translated text in which the summary text is translated into the second language by inputting the summary text to the translation model. Specifically, the identified phrase, which is to be the subject of summarization from among the first phrase and the second phrase, may be input to the translation model after being summarized through the summarization model, and accordingly the second translated text which is the translated text of the summary text may be obtained.

The processor 120 may output the second translated text after the first translated text is output. Specifically, when the first phrase from among the first phrase and the second phrase is identified as the subject of summarization, the translated text of the summary text of the first phrase may be obtained as the second translated text and output after the output of the first translated text, and when the second phrase from among the first phrase and the second phrase is identified as the subject of summarization, the translated text of the summary text of the second phrase may be obtained as the second translated text and output after the output of the first translated text.

According to an embodiment of the present disclosure, the processor 120 may identify the first phrase from among the first phrase and the second phrase, based on the extent of delay being less than a pre-set first threshold value. The processor 120 may obtain a first summary text of the first phrase by inputting the first phrase to the summary model, and obtain the second translated text by inputting the first summary text to the translation model. The processor 120 may output the second translated text after the first translated text is output. Further, the processor 120 may obtain a third translated text in which the second phrase is translated into the second language by inputting the second phrase to the translation model, and the processor 120 may output the third translated text after the second translated text is output.

In some implementations, the processor 120 may also input the first phrase together with at least one phrase prior to the first phrase to the summary model, and in this case, the summary model may output the first summary text of the input first phrase and the at least one prior phrase.

A determination that the extent of delay in translation of the first phrase is less than the pre-set first threshold value may indicate that a rate of translation is excessively fast compared to an input rate of the original text sequence. In response to determining that the rate of translation is excessively fast, based on the extent of delay being less than the first threshold value, the processor 120 may obtain the second translated text by inputting the first summary text of the first phrase to the translation model again while already having obtained the translated text of the first phrase, and output the second translated text prior to outputting the third translated text. Accordingly, the electronic device 100 may relieve the awkwardness when the rate of translation is excessively fast compared to the input rate of the original text sequence, and may enhance user satisfaction on a translation result by emphasizing once more an important content from among the content of the first phrase by outputting the translated summary text of the first phrase until the text corresponding to the second phrase is sufficiently obtained.

In an embodiment of the present disclosure, the processor 120 may identify the second phrase from among the first phrase and the second phrase, based on the extent of delay being greater than or equal to a pre-set second threshold value. The processor 120 may obtain a second summary text of the second phrase by inputting the second phrase to the summary model, and obtain the second translated text by inputting the second summary text to the translation model.

A determination that the extent of delay in translation of the first phrase is greater than or equal to the pre-set second threshold value may indicate that the rate of translation is excessively slow compared to the input rate of the original text sequence. In other words. In response to determining that the translation rate is excessively slow, based on the extent of delay being greater than or equal to the second threshold value, the processor 120 may obtain the second translated text by not obtaining the translated text of the whole second phrase and inputting the second summary text of the second phrase to the translation model, and output the second translated text after the first translated text is output. Accordingly, the electronic device 100 may resolve a delay when the rate of translation is excessively slow (i.e., when translation of the first phrase is excessively delayed) compared to the input rate of the original text sequence by outputting the translated summary text of the second phrase and not the whole second phrase.

In other words, based on outputting the translated text of the whole second phrase when translation of the first phrase is excessively delayed, a difference between the input rate of the original text and an output rate of the translated text may be continued or the difference may be further increased. On the other hand, when translation of the first phrase is excessively delayed according to the present disclosure, the difference between the input rate of the original text and the output rate of the translated text may be reduced when translated text of the summary text of the second phrase is output.

As described above, although an embodiment in which the extent of delay in translation of the first phrase is less than the pre-set first threshold value (i.e., when the rate of translation is excessively fast compared to the input rate of the original text sequence) and an embodiment in which the extent of delay in translation of the first phrase is greater than or equal to the pre-set second threshold value (i.e., when the rate of translation is excessively slow compared to the input rate of the original text sequence) have been briefly described, each of the embodiments will be described in greater detail with reference to FIG. 6 to FIG. 15.

Based on the extent of delay in the translation of the first phrase being greater than or equal to the first threshold value and less than the second threshold value, the processor 120 may obtain the second translated text by inputting the second phrase to the translation model, and output the second translated text after the first translated text is output.

In other words, when extent of delay in translation of the first phrase is not as low to the extent that it is less than the first threshold value and is not as high to the extent that it is greater than or equal to the second threshold value, the processor 120 may not summarize the first phrase or the second phrase, obtain the translated text of the whole second phrase, and output the second translated text after the first translated text is output.

According to the embodiment described above with reference to FIG. 1, the electronic device 100 may resolve the problem of a delay or an awkward pause attributed to the difference between the input rate of the original text and the output rate of the translated text.

Specifically, the electronic device 100 may resolve the problem of an awkward pause by summarizing and outputting the already output translated text once more while waiting for sufficient utterance of the following original text when the rate of translation is excessively fast compared to the input rate of the original text, and resolve the problem of a delay in translation by translating and outputting the summary text of the original text rather than summarizing the whole original text which is to be output next to resolve the delay when the rate of translation is excessively slow compared to the input rate of the original text.

Figure 2:
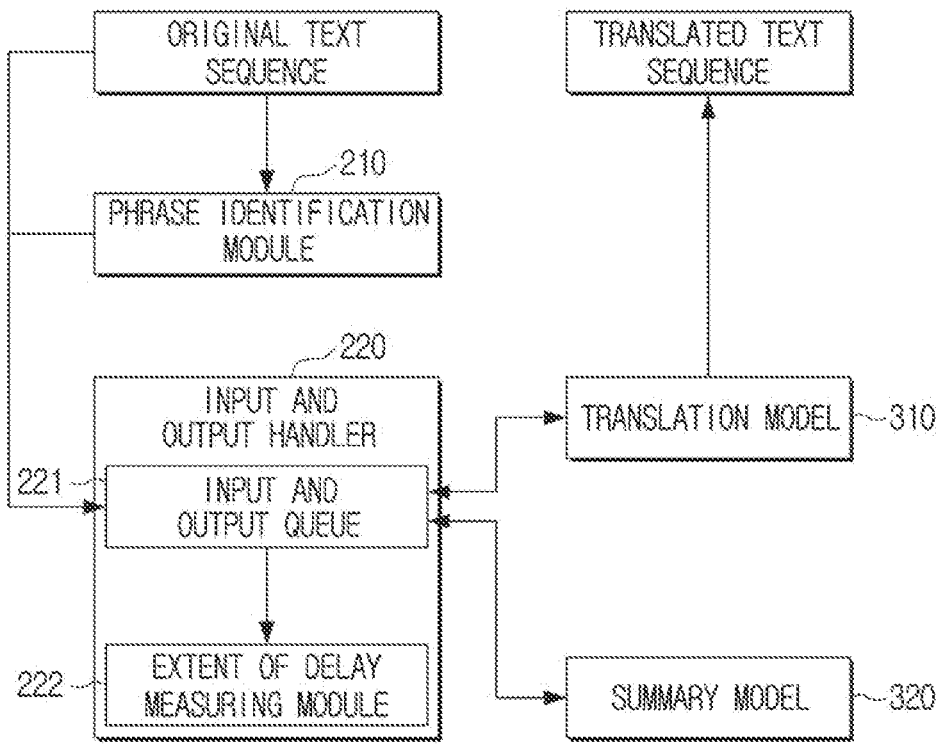
FIG. 2 is a block diagram illustrating a structure which includes a plurality of neural network models and a plurality of modules according to an embodiment.

FIG. 2 is a block diagram illustrating a structure which includes a plurality of neural network models and a plurality of modules according to an embodiment.

As illustrated in FIG. 2, the plurality of neural network models according to the present disclosure may include a translation model 310 and a summary model 320, and the plurality of modules may include a phrase identification module 210 and an input and output handler 220.

Data on the plurality of neural network models and data on the plurality of modules according to the present disclosure may be stored in the memory 110, and the processor 120 may implement various embodiments according to the present disclosure by using the plurality of neural network models and the plurality of modules after accessing the memory 110 and loading data on the plurality of neural network models and data on the plurality of modules to the internal memory 110 of the processor 120. However, the present disclosure is not limited thereto, and at least one from among the plurality of neural network models or at least one from among the plurality of modules may be implemented as a hardware and included in the processor 120 in a system on chip form.

The 'translation model 310' may refer to a neural network model trained to output a translated text sequence corresponding to an input text sequence. Specifically, the translation model may be trained to output the translated text sequence in a second language by translating the input text sequence in a first language. The translation model 310 may output the translated text sequence by sequentially converting each text in the first language which is sequentially input to a text in the second language which is different from the first language.

The 'summary model 320' may refer to a neural network model trained to output a summary text corresponding to an input text sequence (e.g., an input phrase(s)). Specifically, the summary model 320 may be trained to output the summary text in a first language by summarizing the input text sequence in the first language. The summary model 320 may identify a compression rate of each of the words in the input text sequence based on an importance of the words, and output the summary text on the identified phrase based on the identified compression rate. The detailed configuration of the summary model 320 is described in greater detail with reference to FIG. 3.

The 'phrase identification module 210' may refer to a module capable of identifying a plurality of phrases included in an original text sequence. Specifically, the phrase identification module 210 may determine whether each of the texts (e.g., words) in the original text sequence correspond to an end of the phrase, by sequentially analyzing the texts, and may identify each of a plurality of phrases included in the original text sequence according to the determined result. The criterion for distinguishing the end of the phrase may be determined according to a meaning of each word, a punctuation mark, or the like, but it should be noted that there is no particular limitation accompanying the distinguishing criterion of the phrase according to the present disclosure. When the phrase identification module 210 is implemented so as to identify the end of the phrase based on the meaning of each word, a trained neural network may be included in the phrase identification module 210 so that a natural language understanding of the each word that is input may be performed.

The 'input and output handler 220' may refer to a module capable of managing an input and output of the translation model 310 and the summary model 320. The input and output handler 220 may include an 'input and output queue 221' capable of storing the input and output of the translation model 310 and the summary model 320 and an 'extent of delay measuring module 222' capable of measuring the extent of delay of a specific phrase.

Specifically, when the original text sequence is obtained, a plurality of texts included in the original text sequence may be sequentially stored in the input and output queue 221. Then, based on the plurality of phrases included in the original text sequence being identified through the phrase identification module 210, information on each of the plurality of phrases may also be sequentially stored in the input and output queue 221. Here, the information on each of the plurality of phrases may include not only information on the texts included in the plurality of phrases, but also information representing an end of each of the plurality of phrases.

When the plurality of texts included in the original text sequence is sequentially stored in the input and output queue 221, the input and output handler 220 may obtain translated texts corresponding to each of the plurality of phrases by sequentially inputting the plurality of texts by each pre-set unit (e.g., word) to the translation model 310, and store the obtained translated texts to the input and output queue 221.

When the plurality of phrases and the plurality of translated texts corresponding thereto are obtained, the processor 120 may obtain information on the extent of delay in translation of a specific phrase through the extent of delay measuring module 222. When the information on the extent of delay in translation is obtained, the input and output handler 220 may identify a phrase which is to be the subject of summarization from among the plurality of phrases based on the extent of delay in translation.

When the phrase which is to be the subject of summarization is identified, the input and output handler 220 may obtain the summary text by inputting the phrase which is to be the subject of summarization to the summary model 320, and store the obtained summary text to the input and output queue 221. Then, the input and output handler 220 may obtain the translated text corresponding thereto by inputting the obtained summary text to the translation model 310.

In the above, the plurality of neural network models and the plurality of modules according to the present disclosure have been described in brief, and the various embodiments using the plurality of neural network models and the plurality of modules will be described in detail in the description of a control process of the processor 120 and the description of a controlling method of the electronic device 100 according to the present disclosure.

In the above, although the translation model 310 and the summary model 320 according to the present disclosure have been described assuming that both are implemented with a separate neural network model, the translation model 310 and the summary model 320 may be implemented with one integrated neural network model. Based on the translation model 310 and the summary model 320 being implemented with the one integrated neural network model, the integrated neural network model may receive input of information on the phrase which is to be the subject of summarization from among the plurality of phrases included in the original text sequence together with the original text sequence, and may be trained to output the translated text sequence of the original text or the summary text.

Figure 3:
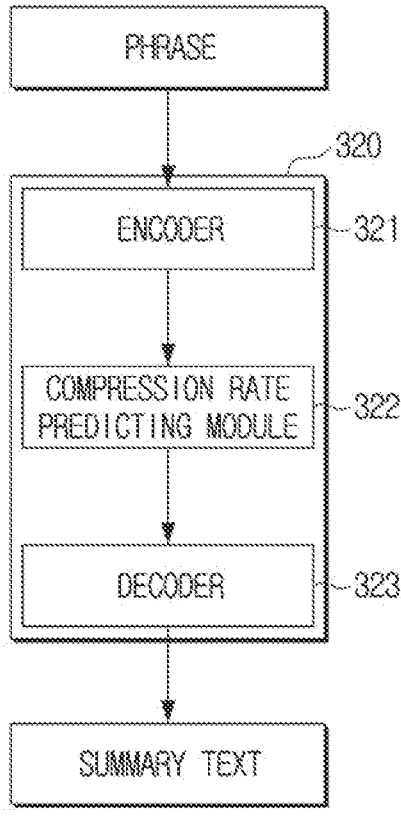
FIG. 3 is a block diagram illustrating in detail a configuration of a summary model according to an embodiment.

FIG. 3 is a block diagram illustrating in detail a configuration of the summary model 320 according to an embodiment.

As illustrated in FIG. 3, the summary model 320 may include an encoder 321, a compression rate predicting module 322, and a decoder 323. That is, the summary model 320 according to the present disclosure may be implemented in a form of a sequence to sequence model which includes the encoder 321 and the decoder 323, and accordingly summarize the phrases sequentially input and sequentially output the translated text of each of the phrases that are input.

The encoder 321 may convert information included in the input phrase to quantified information such as a vector. Then, the decoder 323 may output the summary text by converting the input vector back to the text form. In an example, the decoder 323 may be implemented as an iterative decoder 323.

The compression rate predicting module 322 may refer to a module which predicts the compression rate for each word (or token) included in the phrase based on the vector corresponding to the input phrase. For example, based on the compression rate of a specific word being less than a pre-set threshold value, because it may be predicted as a word with high importance, the compression rate predicting module 322 may set an extent of summarization of the specific word to low. On the other hand, based on the compression rate of the specific word being greater than or equal to the pre-set threshold value, because it may be predicted as a word with low importance, the extent of summarization of the specific word may be set to high.

According to an embodiment, the summary model 320 may be trained to output the summary text based on a length of a pre-set summary text. For example, when pre-set to obtain the summary text including five words, the summary model 320 may output the summary text of a length including the five words regardless of a number of words included in the input phrase. The length of the summary text output through the summary model 320 may be changed according to a developer or user setting, and may be automatically set to a length according a random length or a predetermined criterion.

According to an embodiment of the present disclosure, the summary model 320 may also be trained to output the summary text based on at least one phrase obtained prior to a specific phrase together with the specific phrase (e.g., input phrase). A number of the at least one prior phrases used to determine the summary text may be determined automatically based on the length, content, and the like of the specific phrase (i.e., phrase which is to be the subject of summarization), or may be determined according to a developer or user setting.

For example, based on a first phrase, a second phrase, and a third phrase being sequentially obtained and the summary text corresponding to the each of the first phrase and the second phrase being output, the summary model 320 may determine the summary text of the third phrase based on the first phrase, the second phrase, and the third phrase, and output the summary text of the third phrase.

Determining the summary text based on the first phrase, the second phrase, and the third phrase may include adding a same weight value or different weight values to at least two phrases from among the first phrase, the second phrase and the third phrase, and selecting the specific phrase from among the first phrase, the second phrase and the third phrase.

According to an embodiment of the present disclosure, a phrase corresponding to when the extent of delay is greater than or equal to the first threshold value and less than the second threshold value is also the subject of summarization by the summary model 320, and may be used in obtaining the summary text of the third phrase thereafter. In other words, even when the extent of delay in translation of the first phrase is not excessively high or excessively low, the processor 120 may obtain the summary text by inputting each of the first phrase and the second phrase to the summary model 320, and then use the summary text of each of the first phrase and the second phrase in obtaining the summary text of the third phrase.

In FIG. 3, although an example of when the decoder 323 is included in the summary model 320 has been provided, the decoder 323 for the summary model 320 may be implemented in a form included in the translation model. In other words, in the present disclosure, because the summary text obtained through the summary model 320 is input to the translation model and ultimately output as the translated text, if the decoder 323 for the summary model 320 and the decoder 323 of the translation model are implemented in an integrated form in the translation model, the summary text may be output from the summary model 320 in the text form and then the translated text in a summarized form may be obtained without a middle process of being converted in a form of a vector from the translation model once again.

Figure 4:
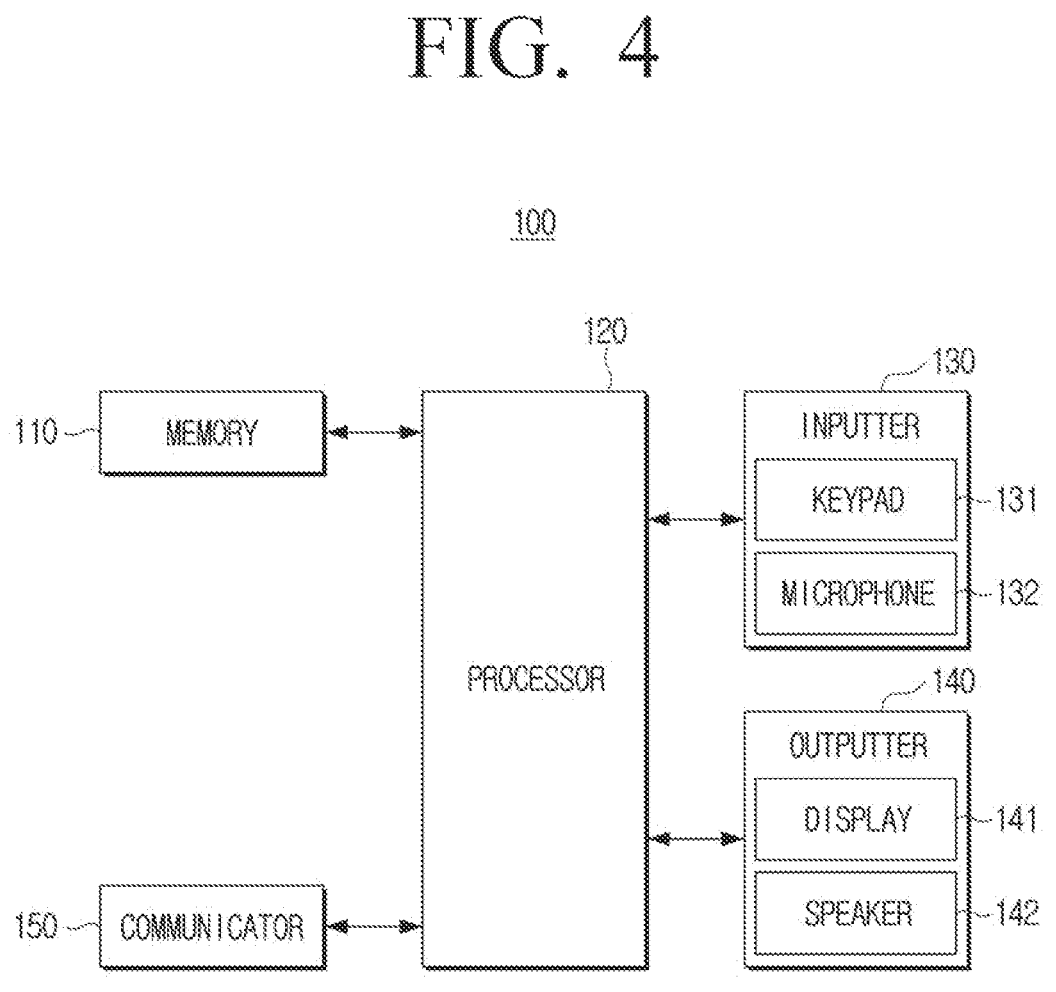

FIG. 4 is a block diagram illustrating in detail a configuration of the electronic device 100 according to an embodiment.

As illustrated in FIG. 4, the electronic device 100 according to the present disclosure may include, in addition to the memory 110 and the processor 120, an inputter 130, an outputter 140, and a communicator 150.

The inputter 130' may include circuitry, and the processor 120 may receive a user command for controlling an operation of the electronic device 100 through the inputter 130. Specifically, as illustrated in FIG. 4, the inputter 130 may include a keypad 131, a microphone 132, and the like. In addition, the inputter 130 may be implemented in a form included in a display as a touch screen.

Specifically, according to various embodiments of the present disclosure, the processor 120 may obtain the original text sequence based on a user input using the keypad 131. In addition, the processor 120 may receive a voice signal according to an utterance of the user through the microphone 132, and convert the received voice signal to an electric signal. Then, the processor 120 may obtain the original text sequence corresponding to the voice signal by inputting the received voice signal to a voice recognition model.

The outputter 140 may include circuitry, and the processor 120 may output various functions which the electronic device 100 may perform through the outputter 140. Then, the outputter 140 may include a display 141 and a speaker 142 as illustrated in FIG. 4.

The display 141 may output image data by the control of the processor 120. Specifically, the display may output an image pre-stored in the memory 110 by the control of the processor 120. Specifically, the display 141 according to an embodiment of the present disclosure may display a user interface stored in the memory 110. The display 141 may be implemented as a liquid crystal display (LCD) panel, organic light emitting diodes (OLED), and the like, and it may be possible for the display 141 to be implemented as a flexible display, a transparent display, and the like according to circumstance. However, it should be noted that the display according to the present disclosure is not limited to a specific type.

The speaker 142 may output audio data by the control of the processor 120, and an indicator may be lit up by the control of the processor 120.

Specifically, according to various embodiments of the present disclosure, the processor 120 may control the display 141 to display the original text sequence or the translated text sequence in the text form. In addition, the processor 120 may control the speaker 142 to display the original text sequence or the translated text sequence in the voice signal form.

The communicator 150 may include circuitry, and may perform communication with an external device. Specifically, the processor 120 may receive various data or information from the external device connected through the communicator, and transmit various data or information to the external device.

The communicator 150 may include at least one from among a WiFi module, a Bluetooth module, a wireless communication module, an NFC module, and an ultra wide band (UWB) module. Specifically, the WiFi module and the Bluetooth module may perform communication in a WiFi method and a Bluetooth method, respectively. When using the WiFi module or the Bluetooth module, various connection information such a service set identifier (S SID) may be first transmitted and received, and various information may be transmitted and received after communicatively connecting using the connection information.

In addition, the wireless communication module may perform communication according to various communication standards such as, for example, and without limitation, IEEE, ZigBee, 3rd generation (3G), 3rd generation partnership project (3GPP), long term evolution (LTE), 5th generation (5G), or the like. Further, the NFC module may perform communication in a near field communication (NFC) method using a 13.56 MHz band from among the various radio-frequency identification (RFID) frequency bands such as, for example, and without limitation, 135 kHz, 13.56 MHz, 433 MHz, 860-960 MHz, 2.45 GHz, or the like. In addition, the UWB module may accurately measure, through communication between the UWB module and a UWB antenna, a time of arrival (ToA) which is time until a pulse reaches a target object, and an angle of arrival (AoA) which is a pulse AoA from a transmitting device, and accordingly it may be possible to recognize a precise distance and position from an error range of within dozens of centimeters (cm) indoors.

Specifically, according to various embodiments of the present disclosure, the processor 120 may receive information on the original text sequence from an external device through the communicator 150, and receive various information such as, for example, and without limitation, information on the translation model, information on the summary model, and the like in addition thereto. In addition, the processor 120 may control the communicator 150 to transmit at least one from among the original text sequence, the summary text sequence, and the translated text sequence obtained according to the present disclosure to the external device.

Like the above, the hardware configurations, software modules, and the like included in the electronic device 100 according to the present disclosure have been described above with reference to FIG. 1 to FIG. 3, but the configurations as shown in FIG. 1 to FIG. 4 are merely examples thereof, and new configurations may be added or a part of the configurations may be omitted in addition to the configuration as shown in FIG. 1 to FIG. 4 in implementing the present disclosure.

At least one from among the neural network models which include the translation model and the summary model may not only be implemented as an on-device form included in the electronic device 100, but also included in an external device connected with the electronic device 100.

Figure 5:
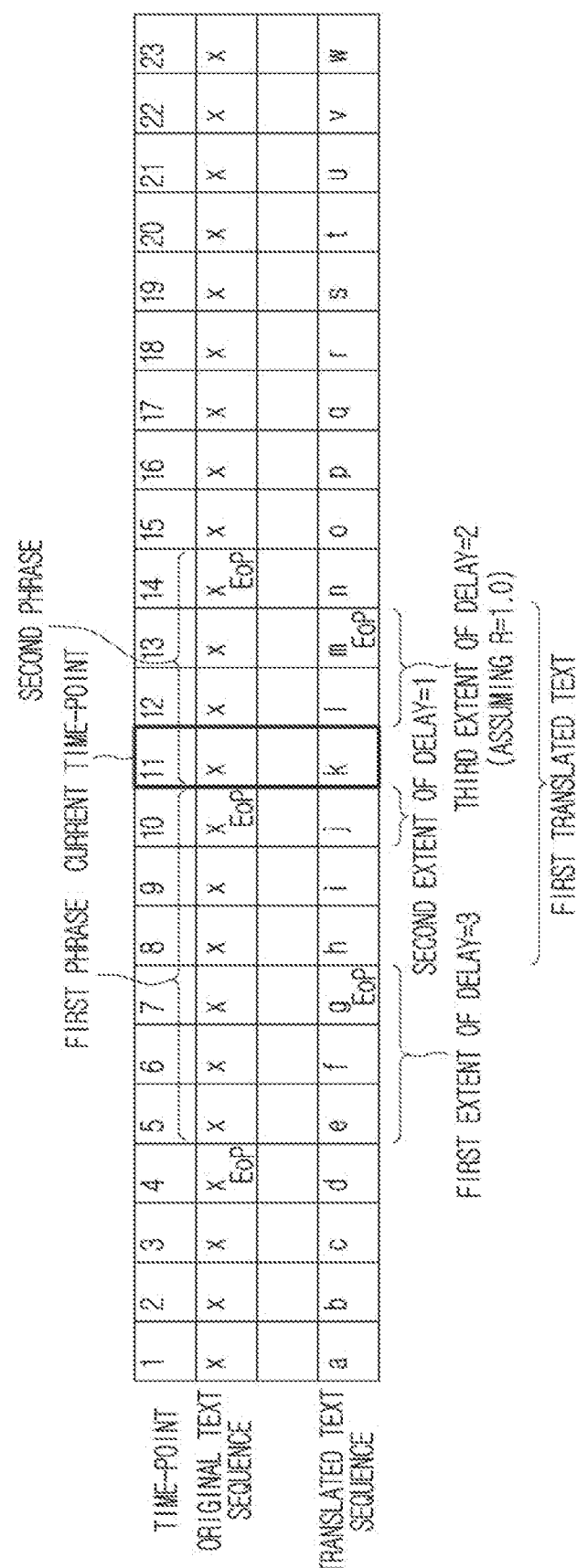
FIG. 5 is a diagram illustrating in detail a method of determining an extent of delay according to an embodiment.

FIG. 5 is a diagram illustrating in detail a method of determining an extent of delay according to an embodiment.

Specifically, FIG. 5 shows the original text sequence and the translated text sequence obtained at each time-point. The unit of time-points 1 to 23 may be one second (hereinafter, a time-point unit is assumed as one second), but the embodiment is not limited thereto, and the time-point unit may be a pre-set time unit. The units of the original text sequence and the translated text sequence may also be variously set according to a developer or user selection. In FIG. 5, EoP represents an end of phrase, and letters of 'x' and 'a, b, c, . . . , w' are random letters to represent each of the texts included in the original text sequence and the translated text sequence.

As shown in FIG. 5, the extent of delay according to the present disclosure may be determined based on at least one of: a first extent of delay, a second extent of delay, and a third extent of delay. FIG. 5 illustrates a process of determining the extent of delay in translation of the first phrase based on time-point 11, but this is merely for convenience of description, and the extent of delay may be determined at each of the time-points.

The first extent of delay may be calculated according to a difference between a time-point at which the first word included in the first phrase is input to the translation model and a time-point at which a first word is output through the translation model. For example, as in the example of FIG. 5, based on the time-point at which the first word of the first phrase is input to the translation model being five seconds and the time-point at which the first word of the first phrase is output through the translation model being eight seconds, the first extent of delay may be calculated as three seconds.

The second extent of delay may be calculated according to a difference between the time-point at which the last word included in the first phrase is input to the translation model and the current time-point. For example, as in the example of FIG. 5, based on the time-point at which the last word included in the first phrase is input to the translation model being ten seconds and the current time-point being eleven seconds, the second extent of delay may be calculated as one second.

The third extent of delay may be calculated according to a difference between the length of the first translated text output until the current time-point and the whole length of the first translated text which is predicted according to the length of the first phrase. Here, the whole length of the first translated text which is predicted according to the length of the first phrase may be determined according to a developer or user setting, and determined according to a learning result of the translation model. For example, based on the translated text of five words being output as an average when translating in the second language when the length of the phrase in the first language is six words according to the learning result of the translation model, the length of the first translated text in the example of FIG. 5 may be predicted as five words. Then, as in the example of FIG. 5, when the length of the first translated text output until the current time-point corresponds to four seconds and when the whole length of the first translated text which is predicted according to the length of the first phrase is predicted to correspond to six seconds, the third extent of delay may be calculated as two seconds.

As described above, when the first extent of delay, the second extent of delay, and the third extent of delay are calculated, the processor 120 may determine a final extent of delay based on at least one from among the first extent of delay, the second extent of delay, and the third extent of delay. According to an embodiment, the processor 120 may determine a maximum extent of delay from among the first extent of delay, the second extent of delay, and the third extent of delay as the extent of delay according to the present disclosure. That is, based on the first extent of delay being three seconds, the second extent of delay being one second, and the third extent of delay being two seconds as in the example of FIG. 5, the processor 120 may determine the extent of delay as three seconds.

When the extent of delay according to the present disclosure is determined, the processor 120 may determine the phrase which is to be the subject of summarization based on whether the determined extent of delay is less than the first threshold value and whether it is greater than or equal to the second threshold value, and in this respect, the above will be described in greater detail below with reference to examples of FIG. 6 to FIG. 15.

FIGS. 6 to 10 are diagrams illustrating in detail a process when an extent of delay is less than a first threshold value according to the present disclosure.

Specifically, FIG. 6 to FIG. 10 are diagrams illustrating in detail embodiments of the extent of delay in translation of the first phrase being less than the pre-set first threshold value (i.e., when the rate of translation is excessively fast compared to the input rate of the original text).

Like FIG. 5, FIG. 6 to FIG. 10 sequentially show tokens of the original text sequence and tokens of the translated text sequence which are obtained by each time-point according to the present disclosure. Further, the EoP represents the end of phrase, and letters 'x' and 'a, b, c, . . . , w' are random letters to represent each of the texts included in the original text sequence and the translated text sequence.

Figure 6:
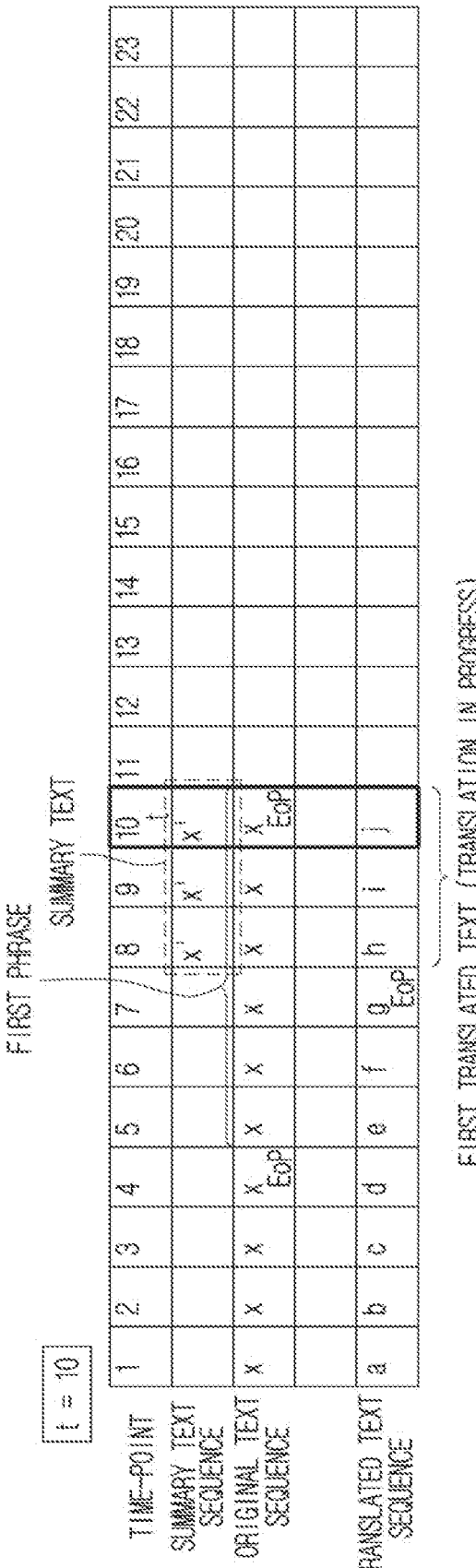
FIGS. 6 to 10 are diagrams illustrating in detail a process when an extent of delay is less than a first threshold value according to an embodiment.
Figure 7:
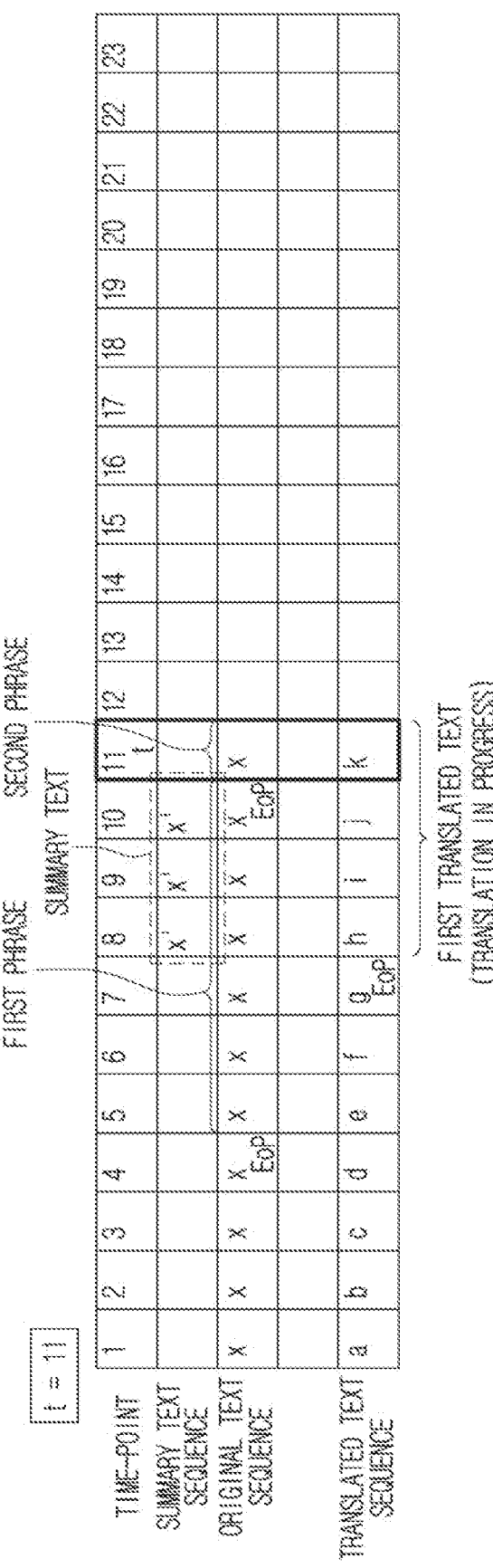
Figure 8:
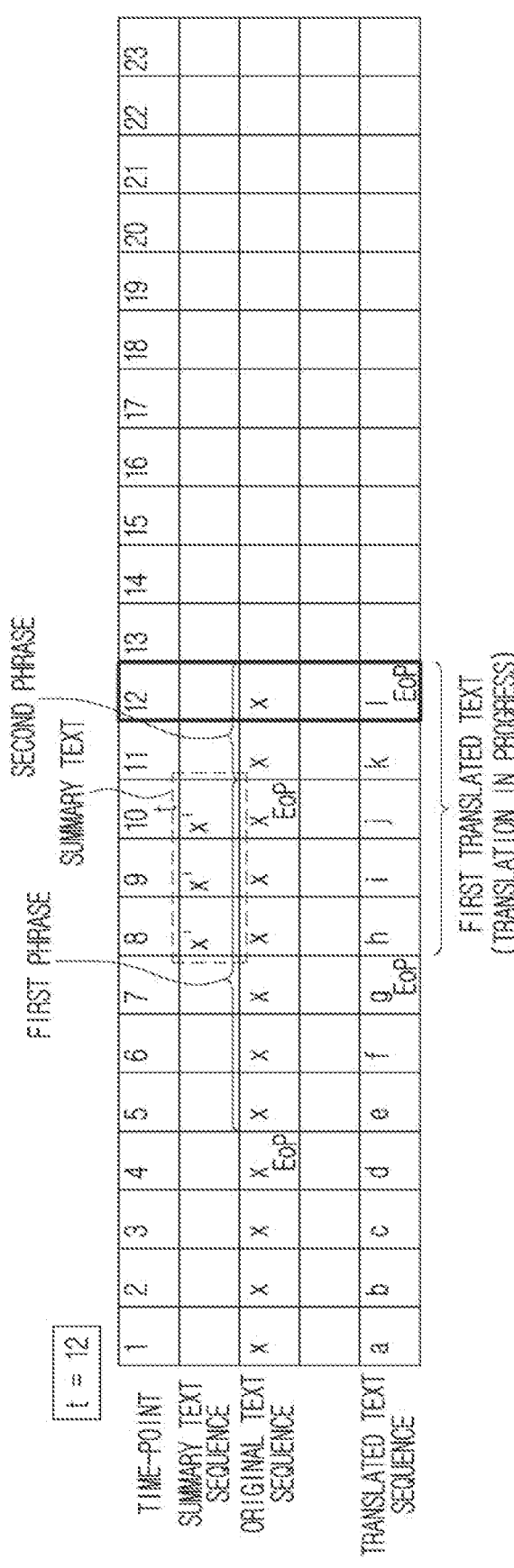
Figure 9:
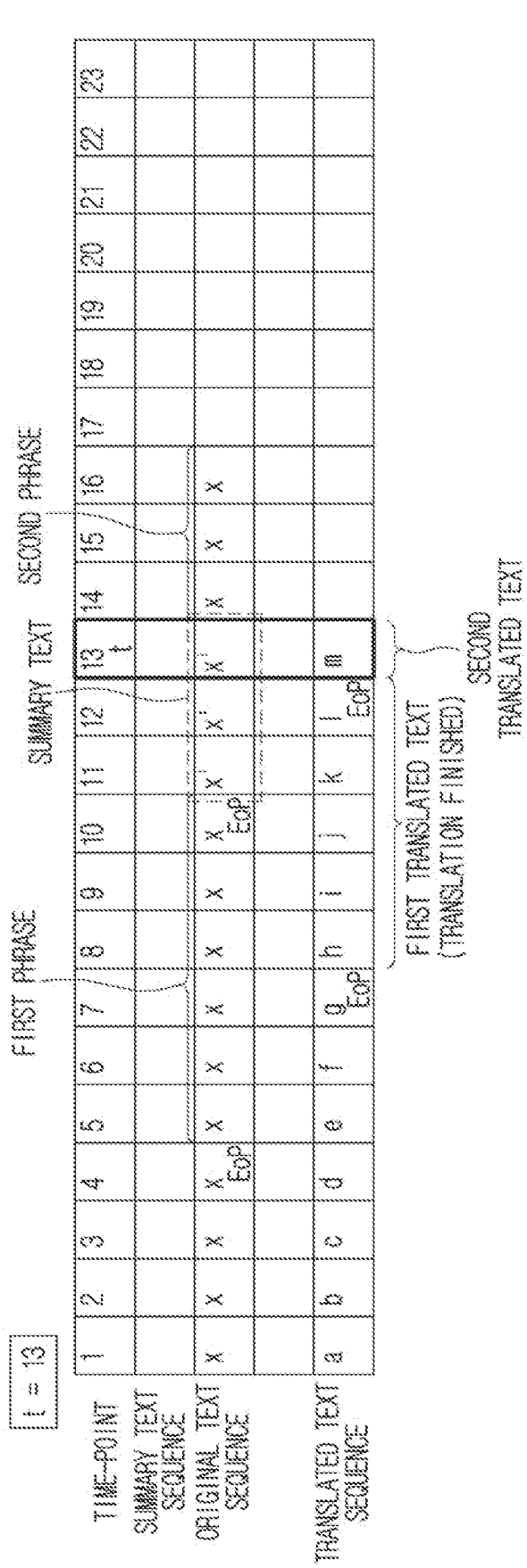

FIG. 6 shows that the obtaining of the first phrase is completed (finished) at time-point 10, and the obtaining of the first translated text of the first phrase is in progress. FIG. 7 shows that the obtaining of the first translated text of the first phrase is in progress at time-point 11, and that the text of the second phrase following the first phrase has begun to be obtained. FIG. 8 shows that the obtaining of the first translated text of the first phrase is completed at time-point 12, and that the text of the second phrase following the first phrase until this time has been obtained by two tokens. In other words, despite the obtaining of the first translated text corresponding to the first phrase being completed during a time from time-point 10 in FIG. 6 until time-point 12 in FIG. 8, the text included in the second phrase may be in a state of having merely obtained only two tokens.

In this case, the processor 120 may identify the first phrase from among the first phrase and the second phrase as the subject of summarization. Then, the processor 120 may obtain, despite being in a state in which the translated text of the first phrase is already obtained, the first summary text of the first phrase by inputting the first phrase to the summary model, and obtain the second translated text by inputting the obtained first summary text to the translation model.

Specifically, during the time from time-point 10 in FIG. 6 until time-point 12 in FIG. 8, the processor 120 may obtain the first summary text corresponding to three tokens as shown in FIG. 6 o FIG. 8 by inputting the first phrase to the summary model. When the first summary text of the first phrase is obtained, the processor 120 may obtain the second translated text by inputting the first summary text of the first phrase to the translation model. The letter 'In' at time-point 13 in FIG. 9 may represent a first token of the second translated text being output after the first translated text.

Figure 10:
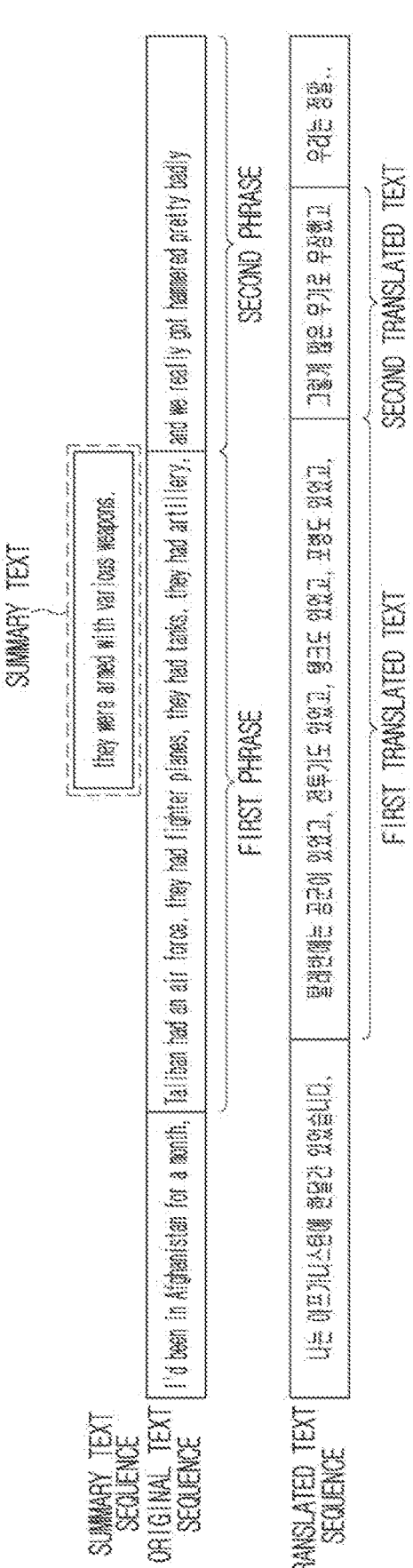

FIG. 10 shows the example of FIG. 6 to FIG. 9 when the first language is English and the second language is Korean. Referring to the example of FIG. 10, it is shown that only two tokens of "and we" from among the second phrase is obtained from the time-point at which the obtaining of the first translated text of "탈레반에는 공군이 있었고, 전투기도 있었고, 탱크도 있었고 포병도 있었고" is completed with respect to the first phrase of "Taliban had an air force, they had fighter planes, they had tanks, they had artillery,".

In this case, the processor 120 may obtain, after obtaining the first summary text of "they were armed with various weapons." by inputting the first phrase of "Taliban had an air force, they had fighter planes, they had tanks, they had artillery," to the summary model, the second translated text of "그렇게 많은 무기로 무장했고" by inputting the obtained first summary text to the translation model, and output the second translated text following the first translated text. Then, based on an additional text of the second phrase being obtained while the second translated text is being output, the processor 120 may obtain the third translated text of the second phrase by inputting the second phrase to the translation model, and output the third translated text after the second translated text is output.

According to the embodiment described above with reference to FIG. 6 to FIG. 10, the electronic device 100 may resolve, based on the rate of translation being excessively fast compared to the input rate of the original text, the problem of the awkward pause by summarizing and outputting the already output translated text once more while waiting for sufficient utterance of the following original text.

FIGS. 11 to 15 are diagrams illustrating in detail a process when an extent of delay is greater than or equal to a second threshold value according to the present disclosure.

Specifically, FIG. 11 to FIG. 15 are diagrams illustrating an embodiment of when the extent of delay in translation of the first phrase is greater than or equal to the pre-set second threshold value (i.e., when the rate of translation is excessively slow compared to the input rate of the original text sequence).

Like FIG. 5, FIG. 11 to FIG. 15 sequentially show tokens of the original text sequence and tokens of the translated text sequence which are obtained by each time-point according to the present disclosure. In FIG. 11 to FIG. 15, the EoP represents the end of phrase, and the letters 'x' and 'a, b, c, . . . , w' are random letters to represent each of the texts included in the original text sequence and the translated text sequence.

Figure 11:
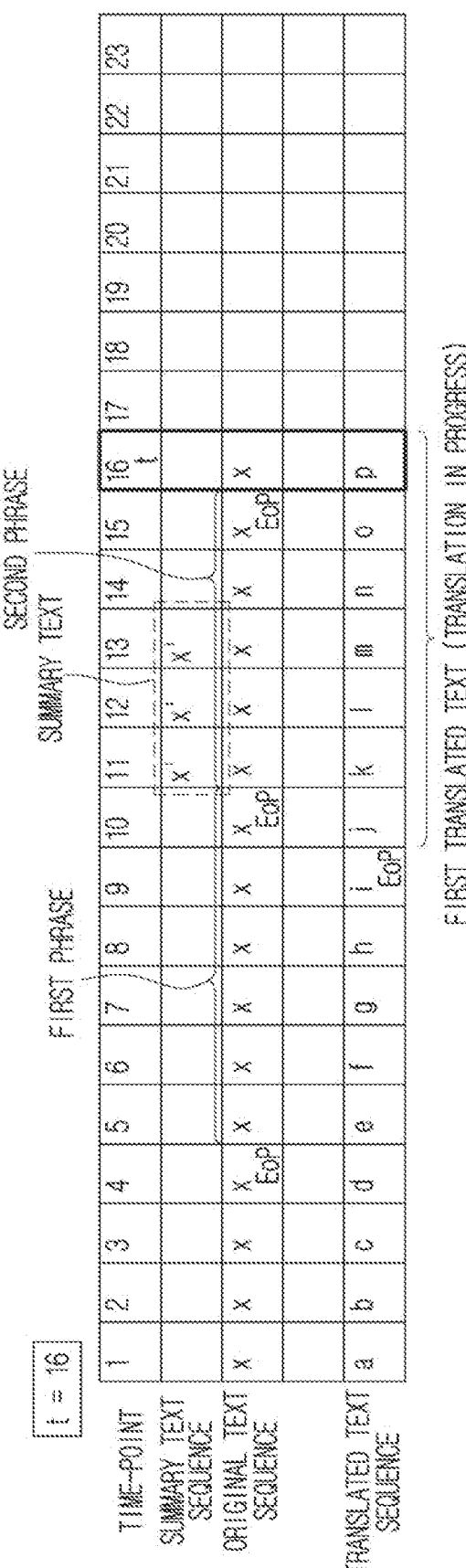
FIGS. 11 to 15 are diagrams illustrating in detail a process when an extent of delay is greater than or equal to a second threshold value according to an embodiment.
Figure 12:
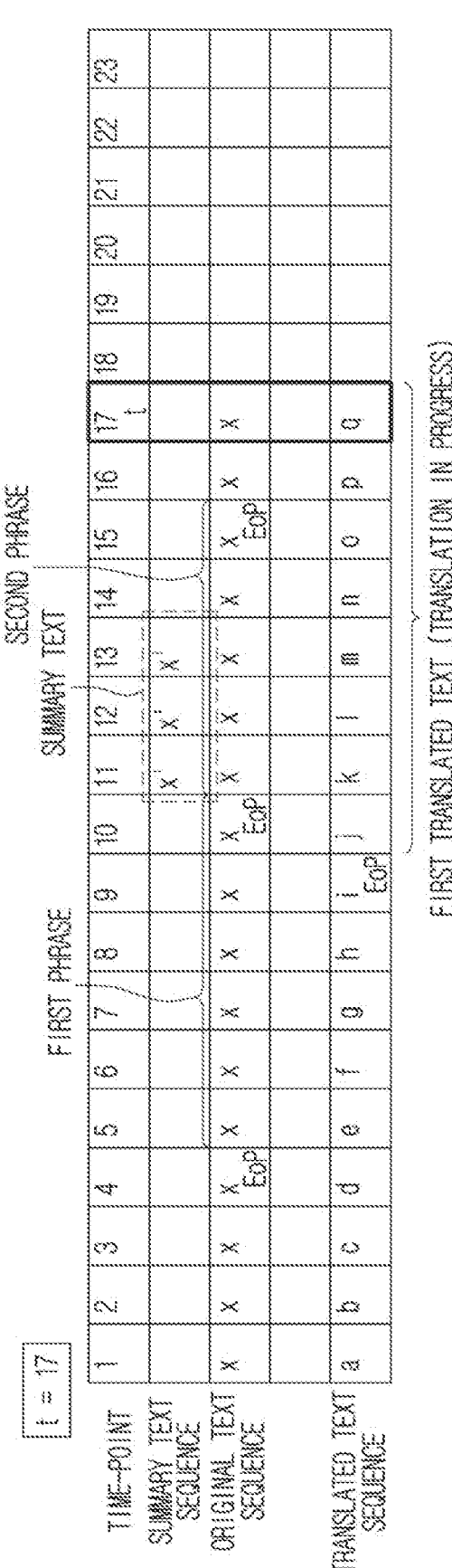
Figure 13:
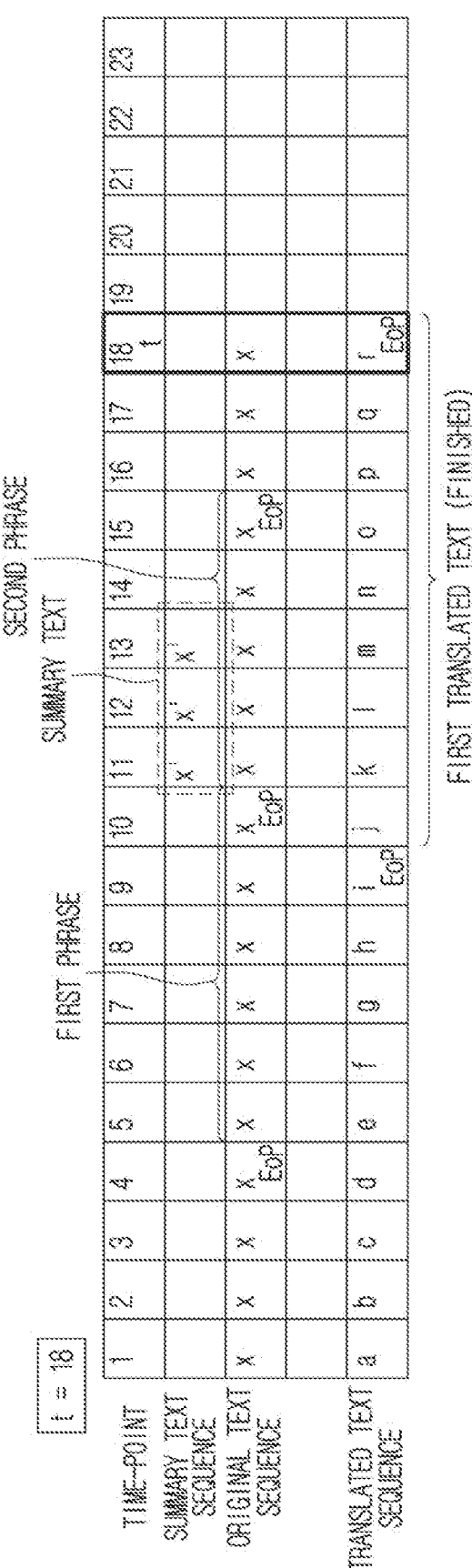

FIG. 11 shows that the obtaining of the second phrase is already completed while the obtaining of the first translated text of the first phrase is in progress at time-point 16, and that the text of the third phrase following the second phrase is obtained further thereto. FIG. 12 shows that the obtaining of the first translated text of the first phrase is still not completed at time-point 17, and that the text of the third phrase is being obtained continuously. FIG. 13 shows that the obtaining of the first translated text of the first phrase is finally completed at time-point 18, but that at this time the text following the second phrase is already obtained by three tokens. In other words, it is shown that translation of the first phrase has been delayed during the time from time-point 16 of FIG. 11 until time-point 18 of FIG. 13.

In this case, the processor 120 may identify the second phrase from among the first phrase and the second phrase as the subject of summarization. Then, the processor 120 may obtain the second translated text by not obtaining the translated text of the whole second phrase and inputting the second summary text of the second phrase to the translation model.

Figure 14:
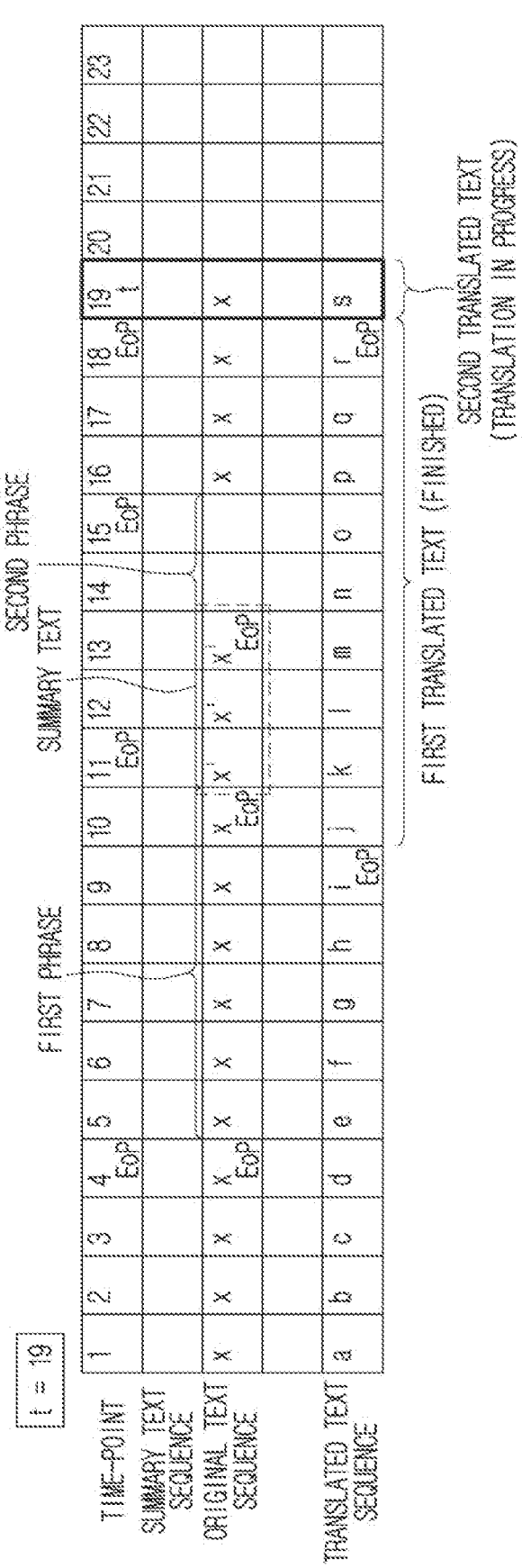

Specifically, during the time from time-point 16 until time-point 18 in FIG. 11 to FIG. 13, the processor 120 may obtain the second summary text corresponding to three tokens as shown in FIGS. 11 to 13 by inputting the second phrase to the summary model. When the second summary text of the second phrase is obtained, the processor 120 may substitute the second phrase of the original text sequence with the obtained second summary text as shown in FIG. 14, and obtain the second translated text by inputting the second summary text of the second phrase and not the whole second phrase to the translation model. The letter 's' at time-point 19 in FIG. 14 may represent the first token of the second translated text being output after the first translated text.

Figure 15:
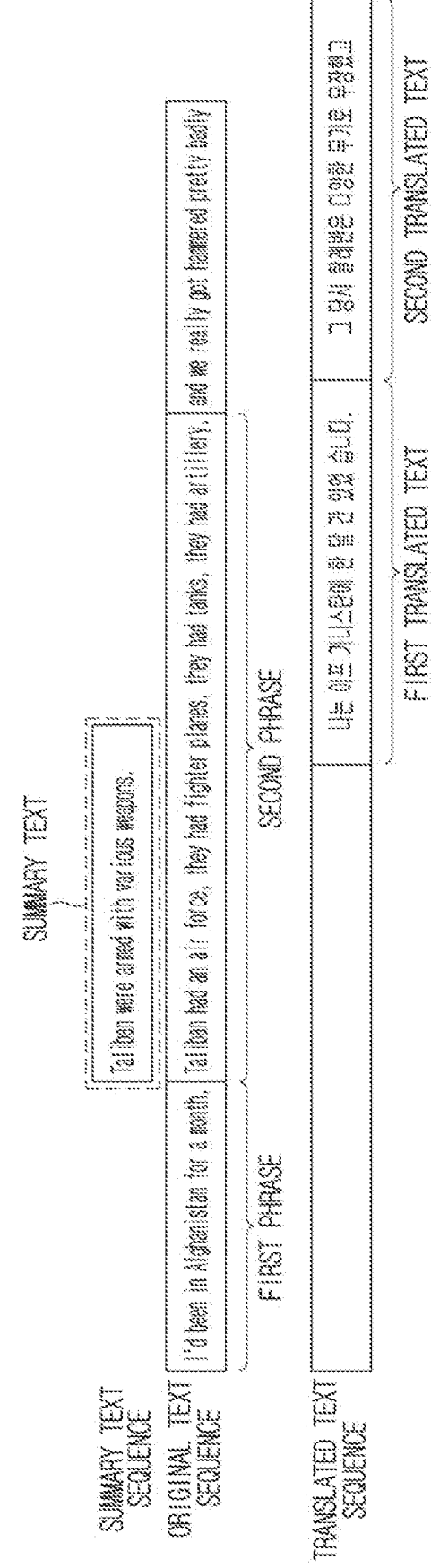

FIG. 15 shows the example of FIG. 11 to FIG. 14 when the first language is English and the second language is Korean. Referring to the example of FIG. 15, it is shown that translation is delayed to the extent that the obtaining of the second phrase of "Taliban had an air force, they had fighter planes, they had tanks, they had artillery," is already completed prior to the obtaining of the first translation text of "나는 아프가니 스탄에 한 달 간 있었 습니다." with respect to the first phrase of "I'd been in Afghanistan for a month," being completed.

In this case, the processor 120 may obtain, after obtaining the second summary text of "Taliban were armed with various weapons." by not inputting the whole second phrase of "Taliban had an air force, they had fighter planes, they had tanks, they had artillery," to the translation model and first inputting to the summary model, the second translated text of "그 당시 탈레반은 다양한 무기로 무장했고" by inputting the obtained second summary text to the translating model, and output the second translated text following the first translated text.

According to an embodiment described above with reference to FIG. 11 to FIG. 15, the electronic device 100 may resolve, based on the rate of translation being excessively slow compared to the input rate of the original text, the problem of the delay in translation by translating and outputting the summary text of the original text rather than summarizing the whole original text to be output next to resolve the delay.

Figure 16:
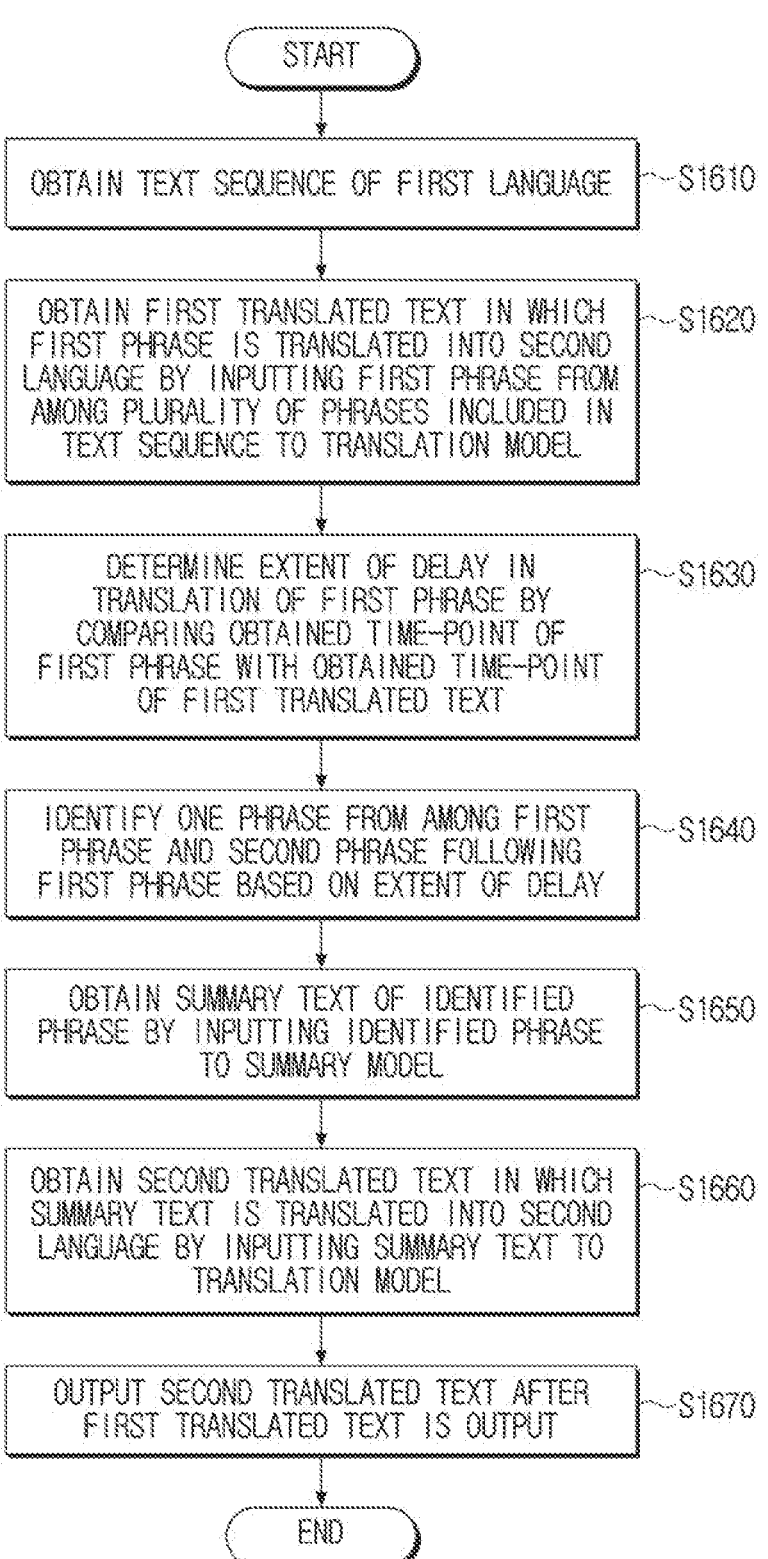
FIG. 16 is a flowchart illustrating schematically a method of controlling an electronic device according to an embodiment.
Figure 17:
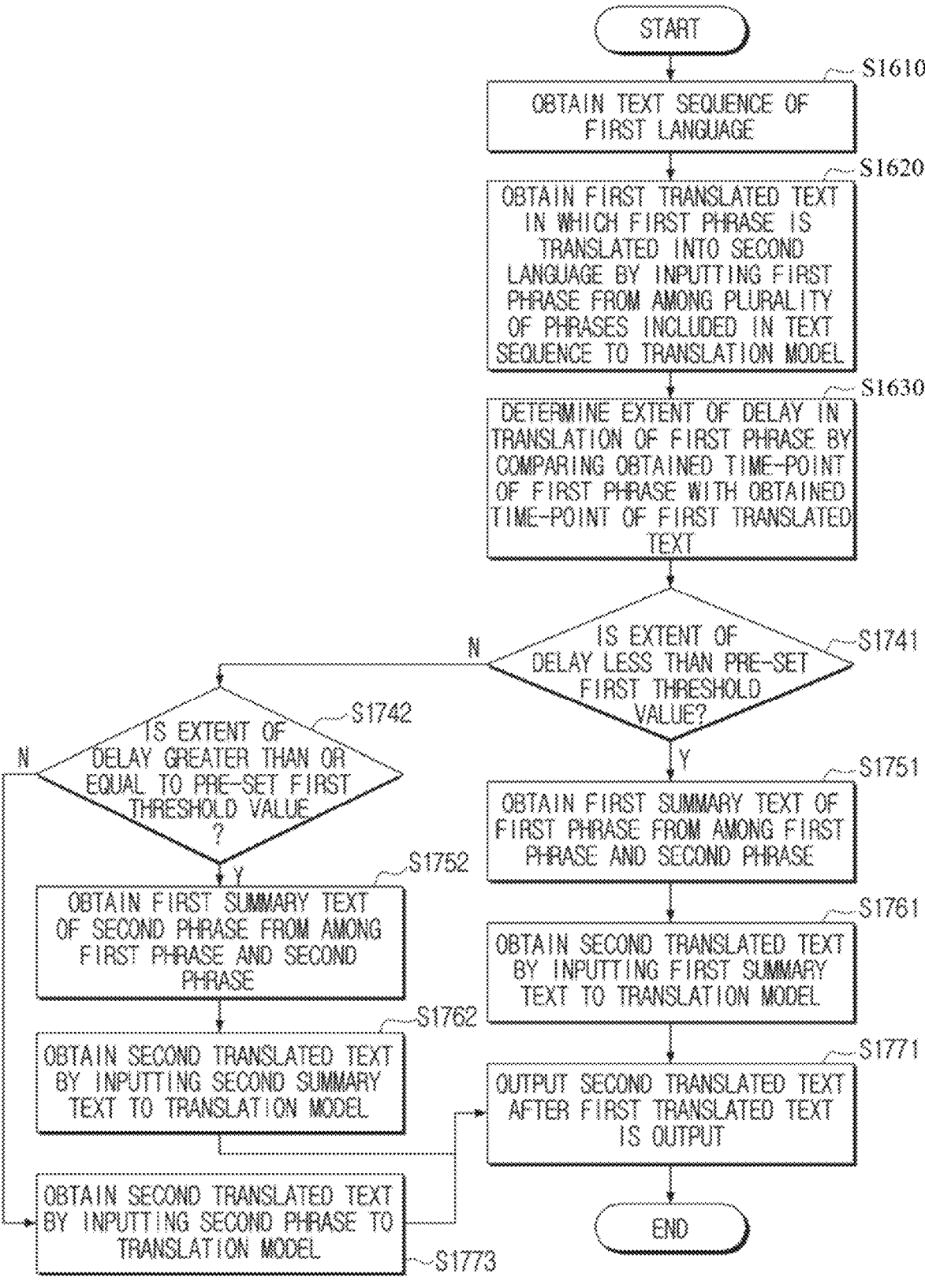
FIG. 17 is a flowchart illustrating a method of controlling an electronic device according to an embodiment.

FIG. 16 is a flowchart illustrating schematically a method of controlling the electronic device 100 according to an embodiment, and FIG. 17 is a flowchart illustrating a method of controlling the electronic device 100 according to another embodiment. The controlling method of the electronic device 100 according to the present disclosure will be described below with reference to both FIG. 16 and FIG. 17.

Referring to FIG. 16, the electronic device 100 may obtain the original text sequence of the first language (S1610). When the original text sequence is obtained, the electronic device 100 may obtain the first translated text in which the first phrase is translated in the second language by inputting the first phrase from among the plurality of phrases included in the original text sequence to the translation model (S1620).

The electronic device 100 may determine the extent of delay in translation of the first phrase by comparing the obtained time-point of the first phrase with the obtained time-point of the first translated text (S1630). Specifically, the extent of delay in translation may be determined based on at least one from among the difference between the time-point at which the first word included in the first phrase is input to the translation model and the time-point at which a first word is output through the translation model, the difference between the time-point at which the last word included in the first phrase is input to the translation model and the current time-point, and the difference between the length of the first translated text output until the current time-point and the whole length of the first translated text which is predicted according to the length of the first phrase.

The electronic device 100 may identify one phrase from among the first phrase and the second phrase following the first phrase based on the extent of delay in translation of the first phrase (S1640). Based on one phrase from among the first phrase and the second phrase being identified, the electronic device 100 may obtain the summary text of the identified phrase by inputting the identified phrase to the summary model (S1650). Based on the summary text of the identified phrase being obtained, the electronic device 100 may obtain the second translated text in which the summary text is translated in the second language by inputting the obtained summary text to the translation model (S1660). Then, the electronic device 100 may output the second translated text after the first translated text is output (S1670).

Referring to FIG. 17, steps S1640 to S1670 which are steps after step S1610 to step S1630 in FIG. 16 will be described in greater detail below.

Referring to FIG. 17, based on the extent of delay in translation of the first phrase being less than the pre-set first threshold value (S1741-Y), the electronic device 100 may obtain the first summary text of the first phrase (S1751) by inputting the first phrase to the summary model, and obtain the second translated text by inputting the first summary text to the translation model (S1761). Then, the electronic device 100 may output the second translated text after the first translated text is output (S1771). Further, the electronic device 100 may obtain the third translated text in which the second phrase is translated in the second language by inputting the second phrase to the translation model, and output the third translated text after the second translated text is output.

Based on the extent of delay in translation of the first phrase being greater than or equal to the first threshold value (S1741-N), the electronic device 100 may identify whether the extent of delay in translation of the first phrase is greater than or equal to the pre-set second threshold value. Based on the extent of delay in translation of the first phrase being greater than or equal to the second threshold value based on the identified result (S1742-Y), the electronic device 100 may obtain the second summary text of the second phrase by inputting the second phrase from among the plurality of phrases to the summary model (S1752), and obtain the second translated text by inputting the second summary text to the translation model (S1762). Then, the electronic device 100 may output the second translated text after the first translated text is output (S1771).

Based on the extent of delay in translation of the first phrase being greater than or equal to the first threshold value (S1741-N) and less than the second threshold value (S1742-N), the electronic device 100 may obtain the second translated text by inputting the second phrase to the translation model (S1773), and output the second translated text after the first translated text is output.

The controlling method of the electronic device 100 according to an embodiment described above may be implemented as a program and provided to the electronic device 100. Specifically, the program including the controlling method of the electronic device 100 may be stored and provided in a non-transitory computer readable medium.

Specifically, with respect to the non-transitory computer readable medium which includes the program that executes the controlling method of the electronic device 100, the controlling method of the electronic device 100 may include obtaining, based on the original text sequence of the first language being obtained, the first translated text in which the first phrase is translated in the second language by inputting the first phrase from among the plurality of phrases included in the original text sequence to the translation model, determining the extent of delay in translation of the first phrase by comparing the obtained time-point of the first phrase with the obtained time-point of the first translated text, identifying one phrase from among the first phrase and the second phrase following the first phrase based on the extent of delay, obtaining the summary text of the identified phrase by inputting the identified phrase to the summary model, obtaining the second translated text in which the summary text is translated in the second language by inputting the summary text to the translation model, and outputting the second translated text after the first translated text is output.

In the above, although the controlling method of the electronic device 100 and the computer readable recording medium which includes the program executing the controlling method of the electronic device 100 have been briefly described, this is merely to omit overlapping descriptions, and various embodiments of the electronic device 100 may be applied to the controlling method of the electronic device 100 and the computer readable recording medium which includes the program executing the controlling method of the electronic device 100.

Functions associated with the neural network model such as the translation model and the summary model as described in the above may be performed through the memory 110 and the processor 120.

The processor 120 may be configured with one or a plurality of processors 120. At this time, the one or the plurality of processors 120 may be a generic-purpose processor 120 such as a central processing unit (CPU) and an application processor (AP), a graphics dedicated processor 120 such as a graphic processing unit (GPU) and a vision processing unit (VPU), or an artificial intelligence dedicated processor 120 such as a neural processing unit (NPU).

The one or the plurality of processors 120 may control to process input data according to a pre-defined operation rule or an artificial intelligence model stored in a non-volatile memory 110 and a volatile memory 110. The pre-defined operation rule or the artificial intelligence model may be characterized by being created through learning.

Here, the being created through learning may mean that a pre-defined operation rule or an artificial intelligence model of a desired characteristic is created by applying a learning algorithm to multiple learning data. The learning may be carried out in a device itself in which the artificial intelligence according to the present disclosure is performed, or carried out through a separate server/system.

The artificial intelligence model may be configured of a plurality of neural network layers. Each layer may include a plurality of weight values, and perform processing of the layer through the processing results of a previous layer and the processing of the plurality of weight values. Examples of the neural network may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Generative Adversarial Networks (GAN), and a Deep-Q Networks, and the neural network of the present disclosure is not limited to the above-described examples, unless otherwise specified.

The learning algorithm may be a method for a predetermined target machine to make decisions or predictions on its own by using multiple learning data to train the predetermined target machine (e.g., robot). Examples of the learning algorithm may include supervised learning, unsupervised learning, semi-supervised learning, or reinforcement learning, and the learning algorithm of the present disclosure is not limited to the above-described examples unless otherwise specified.

The machine-readable storage medium may be provided in the form of a non-transitory storage medium. Here, the 'non-transitory storage medium' merely means that the storage medium is a tangible device, and does not include a signal (e.g., electromagnetic waves), and the term does not differentiate data being semi-permanently stored or being temporarily stored in the storage medium. For example, the 'non-transitory storage medium' may include a buffer in which the data is temporarily stored.

According to an embodiment, a method according to the various embodiments disclosed herein may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™) or directly between two user devices (e.g., smartphones). In the case of online distribution, at least a portion of the computer program product (e.g., downloadable app) may be at least stored temporarily in a server of a manufacturer, a server of an application store, or a storage medium readable by a device such as the memory 110 of a relay server, or temporarily generated.

Each of the elements (e.g., a module or a program) according to the various embodiments of the present disclosure as described in the above may be formed as a single entity or a plurality of entities, and some sub-elements of the abovementioned sub-elements may be omitted, or other sub-elements may be further included in the various embodiments. Alternatively or additionally, some elements (e.g., modules or programs) may be integrated into one entity to perform the same or similar functions performed by each of the elements prior to integration.

Operations performed by a module, a program, or another element, in accordance with various embodiments, may be executed sequentially, in a parallel, repetitively, or in a heuristic manner, or at least some operations may be executed in a different order, omitted or another operation may be added.

The term "part" or "module" used in the present disclosure may include a unit configured as a hardware, software, or firmware, and may be used interchangeably with terms such as, for example, and without limitation, logic, logic blocks, components, circuits, or the like. "Part" or "module" may be a component integrally formed or a minimum unit or a part of the component performing one or more functions. For example, a module may be configured as an application-specific integrated circuit (ASIC).

The various embodiments of the present disclosure may be implemented with software including instructions stored in a machine-readable storage media (e.g., computer). The machine may call an instruction stored in the storage medium, and as a device capable of operating according to the called instruction, may include an electronic device (e.g., electronic device 100) according to the above-mentioned embodiments.

Based on the instruction being executed by the processor, the processor may directly or using other elements under the control of the processor perform a function corresponding to the instruction. The instruction may include a code generated by a compiler or executed by an interpreter.

While the present disclosure has been illustrated and described with reference to example embodiments thereof, it will be understood that the various example embodiments are intended to be illustrative, not limiting. It will be understood by those skilled in the art that various changes in form and details may be made therein without departing from the true spirit and full scope of the present disclosure, including the appended claims and their equivalents.

What is claimed is:

1. An electronic device comprising:
   memory configured to store instructions; and
   at least one processor configured to execute the instructions,
   wherein the instructions, when executed by the at least one processor, cause the electronic device to:
      obtain, based on an original text sequence in a first language comprising a plurality of phrases, a first translated text in which a first phrase of the original text sequence is translated in a second language by inputting the first phrase to a translation model;
      determine an extent of delay in translation of the first phrase by comparing a time-point of the first phrase with a time-point of the first translated text;
      identify, based on the extent of delay, one phrase from among the first phrase and a second phrase of the original text sequence following the first phrase;
      obtain a summary text of the identified phrase by inputting the identified phrase to a summary model;
      obtain, based on the extent of delay, a second translated text in which the identified phrase or the summary text is translated in the second language by inputting the identified phrase or the summary text to the translation model; and
      output the second translated text after the first translated text is output, and
   wherein the instructions, when executed by the at least one processor, further cause the electronic device to:
      based on the extent of delay being less than a pre-set first threshold value, obtain a first summary text of the first phrase by inputting the first phrase into the summary model, obtain the second translated text by inputting the first summary text into the translation model, and output the second translated text after the first translated text is output; and
      based on the extent of delay being greater than or equal to a pre-set second threshold value greater than the pre-set first threshold value, obtain a second summary text of the second phrase by inputting the second phrase from among the plurality of phrases to the summary model, obtain the second translated text by inputting the second summary text to the translation model, and output the second translated text after the first translated text is output,
   wherein the translation model comprises a first neural network model trained to obtain a translated text sequence corresponding to the input original text sequence,
   wherein the summary model comprises a second neural network model trained to obtain the summary text corresponding to an input phrase,
   wherein the summary model comprises a sequence to sequence model comprising an encoder and a decoder,
   wherein the encoder is configured to convert information included in the input phrase to quantified information, and
   wherein the decoder is configured to output the summary text by converting the quantified information back to text form.

2. The electronic device of claim 1, wherein the instructions, when executed by the at least one processor, further cause the electronic device to:
   obtain a third translated text in which the second phrase is translated in the second language by inputting the second phrase to the translation model; and
   output the third translated text after the second translated text is output.

3. The electronic device of claim 1, wherein the instructions, when executed by the at least one processor, further cause the electronic device to:
   obtain, based on the extent of delay being greater than or equal to the pre-set first threshold value and less than the pre-set second threshold value, the second translated text by inputting the second phrase to the translation model.

4. The electronic device of claim 1, wherein the extent of delay is determined based on at least one of: a difference between a time-point at which a first word in the first phrase is input to the translation model and a time-point at which a first output word is output through the translation model, a difference between a time-point at which a last word in the first phrase is input to the translation model and a current time-point, and a difference between a length of the first translated text output until the current time-point and a whole length of the first translated text which is predicted according to a length of the first phrase.

5. The electronic device of claim 1, wherein the instructions, when executed by the at least one processor, further cause the electronic device to:
   identify the plurality of phrases in the original text sequence based on whether each of a plurality of words in the original text sequence corresponds to an end of phrase; and
   store information on each of the plurality of phrases in the memory.

6. The electronic device of claim 1, wherein the summary model is configured to:
   identify, based on a plurality of words in the identified phrase being input to the summary model, a compression rate of each of the words based on an importance of the word; and
   output the summary text of the identified phrase based on the identified compression rate.

7. The electronic device of claim 6, wherein the summary model is further configured to obtain the summary text based on a length of a pre-set summary text.

8. The electronic device of claim 7, wherein the summary model is further configured to obtain the summary text based on the identified phrase and at least one phrase obtained prior to the identified phrase.

9. A method of controlling an electronic device, the method comprising:

obtaining, based on an original text sequence in a first language comprising a plurality of phrases, a first translated text in which a first phrase of the original text sequence is translated in a second language by inputting the first phrase to a translation model;

determining an extent of delay in translation of the first phrase by comparing a time-point of the first phrase with a time-point of the first translated text;

identifying, based on the extent of delay, one phrase from among the first phrase and a second phrase of the original text sequence following the first phrase;

obtaining a summary text of the identified phrase by inputting the identified phrase to a summary model;

obtaining, based on the extent of delay, a second translated text in which the identified phrase or the summary text is translated in the second language by inputting the identified phrase or the summary text to the translation model; and outputting the second translated text after the first translated text is output, wherein the method further comprises:

based on the extent of delay being less than a pre-set first threshold value, obtain a first summary text of the first phrase by inputting the first phrase to the summary model, obtain the second translated text by inputting the first summary text to the translation model, and output the second translated text after the first translated text is output; and based on the extent of delay being greater than or equal to a pre-set second threshold value greater than the pre-set first threshold value, obtain a second summary text of the second phrase by inputting the second phrase from among the plurality of phrases to the summary model, obtain the second translated text by inputting the second summary text to the translation model, and output the second translated text after the first translated text is output, wherein the translation model comprises a first neural network model trained to obtain a translated text sequence corresponding to the input original text sequence, wherein the summary model comprises a second neural network model trained to obtain the summary text corresponding to an input phrase, wherein the summary model comprises a sequence to sequence model comprising an encoder and a decoder, wherein the encoder is configured to convert information included in the input phrase to quantified information, and wherein the decoder is configured to output the summary text by converting the quantified information back to text form.

10. The method of claim 9, further comprising:

obtaining a third translated text in which the second phrase is translated in the second language by inputting the second phrase to the translation model; and outputting the third translated text after the second translated text is output.

11. The method of claim 9, further comprising:

obtaining, based on the extent of delay being greater than or equal to the pre-set first threshold value and less than the pre-set second threshold value, the second translated text by inputting the second phrase to the translation model.

12. A non-transitory computer-readable medium having computer readable program code or instructions stored therein, which when executed by at least one processor cause the at least one processor to execute a method of controlling an electronic device, the method comprising:

obtaining, based on an original text sequence in a first language comprising a plurality of phrases, a first translated text in which a first phrase of the original text sequence is translated in a second language by inputting the first phrase to a translation model;

determining an extent of delay in translation of the first phrase by comparing a time-point of the first phrase with a time-point of the first translated text;

identifying, based on the extent of delay, one phrase from among the first phrase and a second phrase of the original text sequence following the first phrase;

obtaining a summary text of the identified phrase by inputting the identified phrase to a summary model;

obtaining, based on the extent of delay, a second translated text in which the identified phrase or the summary text is translated in the second language by inputting the identified phrase or the summary text to the translation model; and outputting the second translated text after the first translated text is output, wherein the method further comprises:

based on the extent of delay being less than a pre-set first threshold value, obtain a first summary text of the first phrase by inputting the first phrase to the summary model, obtain the second translated text by inputting the first summary text to the translation model, and output the second translated text after the first translated text is output; and based on the extent of delay being greater than or equal to a pre-set second threshold value greater than the pre-set first threshold value, obtain a second summary text of the second phrase by inputting the second phrase from among the plurality of phrases to the summary model, obtain the second translated text by inputting the second summary text to the translation model, and output the second translated text after the first translated text is output, wherein the translation model comprises a first neural network model trained to obtain a translated text sequence corresponding to the input original text sequence, wherein the summary model comprises a second neural network model trained to obtain the summary text corresponding to an input phrase, wherein the summary model comprises a sequence to sequence model comprising an encoder and a decoder, wherein the encoder is configured to convert information included in the input phrase to quantified information, and wherein the decoder is configured to output the summary text by converting the quantified information back to text form.

13. The non-transitory computer-readable medium of claim 12, wherein the method further comprises:

obtaining a third translated text in which the second phrase is translated in the second language by inputting the second phrase to the translation model; and outputting the third translated text after the second translated text is output.

14. The non-transitory computer-readable medium of claim 12, wherein the method further comprises:

obtaining, based on the extent of delay being greater than or equal to the pre-set first threshold value and less than the pre-set second threshold value, the second translated text by inputting the second phrase to the translation model.

\* \* \* \* \*